United States Patent
Minguez et al.

(10) Patent No.: US 11,767,225 B2
(45) Date of Patent: Sep. 26, 2023

(54) SOLID-STATE CRYSTALLIZATION OF METAL ORGANIC FRAMEWORKS WITHIN MESOPOROUS MATERIALS METHODS AND HYBRID MATERIALS THEREOF

(71) Applicant: Research Triangle Institute, Research Triangle Park, NC (US)

(72) Inventors: Ignacio Luz Minguez, Durham, NC (US); Mustapha Soukri, Cary, NC (US); Marty Lail, Raleigh, NC (US)

(73) Assignee: Research Triangle Institute, Research Triangle Park (NC)

( * ) Notice: Subject to any disclaimer, the term of this patent is extended or adjusted under 35 U.S.C. 154(b) by 45 days.

(21) Appl. No.: 16/324,296

(22) PCT Filed: Aug. 10, 2017

(86) PCT No.: PCT/US2017/046231
§ 371 (c)(1),
(2) Date: Feb. 8, 2019

(87) PCT Pub. No.: WO2018/031733
PCT Pub. Date: Feb. 15, 2018

(65) Prior Publication Data
US 2019/0169036 A1    Jun. 6, 2019

Related U.S. Application Data

(60) Provisional application No. 62/373,047, filed on Aug. 10, 2016.

(51) Int. Cl.
*C01B 39/02* (2006.01)
*C01B 39/48* (2006.01)
(Continued)

(52) U.S. Cl.
CPC .......... *C01B 39/026* (2013.01); *B01J 20/103* (2013.01); *B01J 20/226* (2013.01);
(Continued)

(58) Field of Classification Search
CPC . B01J 20/08; B01J 20/10; B01J 20/103; B01J 20/106; B01J 20/16; B01J 20/165; B01J 20/18; B01J 20/226; B01J 20/3265
See application file for complete search history.

(56) References Cited

U.S. PATENT DOCUMENTS 9,566,575 B2 * 2/2017 Bohringer .......... B01J 20/28069
2009/0263621 A1 * 10/2009 Chang .................. C07F 15/025
428/116

(Continued)

FOREIGN PATENT DOCUMENTS

CN    101541427 A    9/2009
CN    103920462 B    7/2014
(Continued)

OTHER PUBLICATIONS

Machine translation of Sun et al. CN105056895A, publication dated Nov. 18, 2015.*
(Continued)

*Primary Examiner* — Jun Li
(74) *Attorney, Agent, or Firm* — Olive Law Group, PLLC; Nathan P. Letts

(57) ABSTRACT

A method, comprising i) contacting an aqueous solution of an organic ligand salt of the formula $A_x(L^{-x})$ with a mesoporous material (MPM) to form an impregnated mesoporous salt material of the formula $A_x(L^{-x})$/MPM, ii) treating the impregnated mesoporous salt material with an aqueous acidic solution to form an impregnated mesoporous
(Continued)

acid material of the formula $H_x(L^{-x})$/MPM, iii) contacting an aqueous solution of a metal precursor of the formula $M^{+y}(B)y$ with the impregnated mesoporous acid material to form an impregnated mesoporous metal organic framework precursor of the formula $[M^{+y}(B)_y][H_x(L^{-x})]$/MPM, and iv) at least one of 1) heating the impregnated mesoporous metal organic framework precursor in the absence of a solvent or 2) exposing the impregnated mesoporous metal organic framework precursor to a volatile vapor in the absence of a solvent such that the heating or the exposing forms a hybrid material of the formula $(M^{+y}L^{-x})$/MPM, wherein the hybrid material comprises a nano-crystalline metal organic framework (MOF) embedded within the mesoporous material.

19 Claims, 21 Drawing Sheets

(51) Int. Cl.
| | |
|---|---|
| *B01J 29/06* | (2006.01) |
| *C01B 39/00* | (2006.01) |
| *B01J 20/22* | (2006.01) |
| *B01J 20/10* | (2006.01) |
| *B01J 20/32* | (2006.01) |
| *B01J 31/16* | (2006.01) |

(52) U.S. Cl.
CPC ....... *B01J 20/3236* (2013.01); *B01J 20/3265* (2013.01); *B01J 29/06* (2013.01); *B01J 31/1691* (2013.01); *C01B 39/00* (2013.01); *C01B 39/02* (2013.01); *C01B 39/48* (2013.01); *B01D 2253/108* (2013.01); *B01D 2253/204* (2013.01); *B01D 2259/4583* (2013.01)

(56) References Cited

U.S. PATENT DOCUMENTS

| | | | |
|---|---|---|---|
| 2010/0043636 A1 | 2/2010 | Hwang et al. | |
| 2011/0118490 A1* | 5/2011 | Hwang | C07F 11/005 556/44 |
| 2011/0144365 A1* | 6/2011 | Park | C01B 33/18 556/9 |
| 2011/0160412 A1* | 6/2011 | Thieuleux | B01J 31/0295 526/126 |
| 2012/0128748 A1* | 5/2012 | Nagata | A61Q 1/12 424/401 |
| 2012/0152845 A1 | 6/2012 | Levan et al. | |
| 2013/0273461 A1 | 10/2013 | Liu et al. | |
| 2014/0099571 A1* | 4/2014 | Proietti | H01M 4/8828 429/527 |
| 2015/0087044 A1* | 3/2015 | Ma | C12N 9/0065 435/188 |
| 2016/0346756 A1* | 12/2016 | Rubio Martinez | C07F 1/08 |
| 2016/0346759 A1* | 12/2016 | Zhou | C01B 3/508 |
| 2017/0009047 A1* | 1/2017 | Kinoshita | C08G 73/02 |
| 2017/0320790 A1* | 11/2017 | Hwang | B01J 37/036 |

FOREIGN PATENT DOCUMENTS

| | | |
|---|---|---|
| CN | 104056599 B | 9/2014 |
| CN | 104230962 A | 12/2014 |
| CN | 104667876 A | 6/2015 |
| CN | 105056895 A | 11/2015 |
| CN | 107774331 A | 3/2018 |
| EP | 2341031 A1 | 7/2011 |
| JP | 2011126775 A | 6/2011 |
| KR | 100803964 B1 | 2/2008 |
| KR | 20110068183 A | 6/2011 |
| KR | 20200127038 A | 11/2020 |
| WO | 2018031733 A1 | 2/2018 |

OTHER PUBLICATIONS

International Preliminary Report on Patentability issued in counterpart PCT Application No. PCT/US2017/046231 dated Feb. 12, 2019.
Corma, A. et al. 2010. "Engineering Metal Organic Frameworks for Heterogeneous Catalysis." Chem. Rev. vol. 110. pp. 4606-4655.
Della Rocca, Joseph et al. 2011. "Nanoscale Metal—Organic Frameworks for Biomedical Imaging and Drug Delivery." Accounts of Chemical Research. vol. 44. No. 10. pp. 957-968.
Doherty, Cara M. et al. 2014. "Using Functional Nano- and Microparticles for the Preparation of Metal-Organic Framework Composites with Novel Properties." Accounts of Chemical Research. vol. 47. No. 2. pp. 396-405.
Furtado, Amanda M.B. et al. 2011. "Mesoporous silica-metal organic composite: synthesis, characterization, and ammonia adsorption." Journal of Materials Chemistry. vol. 21, pp. 6698-6706.
Furukawa, Hiroyasu et al. 2013."The Chemistry and Applications of Metal-Organic Frameworks." Science. vol. 341. p. 974 (123044)(fourteen (14) pages).
Karimi, Zahra and Ali Morsali. 2013. "Modulated formation of Metal-Organic Frameworks by Oriented Growth over Mesoporous Silica." The Royal Society of Chemistry. Supplemental material (two (2) pages).
Karimi, Zahra and Morsali, Ali. 2013. "Modulated formation of metal-organic frameworks by oriented growth over mesoporous silica." Journal of Materials Chemistry A. vol. 1. pp. 3047-3054.
Kreno, Lauren E. et al. 2012. "Metal-Organic Framework Materials as Chemical Sensors." Chem. Rev. vol. 112. pp. 1105-1125.
Li, Jian-Rong et al. 2012. "Metal-Organic Frameworks for Separations." Chem. Rev. vol. 112. pp. 869-932.
Li, Shaozhou, and Fengwei Huo. 2015. "Metal-organic framework composites: from fundamentals to applications." Nanoscale. vol. 7. pp. 7482-7501.
Li, Zheng and Hua Chun Zeng. 2014. "Armored MOFs: enforcing soft microporous MOF nanocrystals with hard mesoporous silica." J. Am. Chem. Soc. (twenty-two (22) pages).
Liu, Yunyang et al. 2008. "Synthesis of continuous MOF-5 membranes on porous α-alumina substrates." Microporous and Mesoporous Materials. vol. 118. pp. 296-301.
Metal-organic framework. Wikipedia. Accessed Jul. 24, 2017. (twenty-four (24) pages).
Silva, Patricia, et al. 2015. "Multifunctional metal-organic frameworks: from academia to industrial applications." Chem. Soc. Review. vol. 44. pp. 6774-6803.
Sorribas et al. 2015. "Synthesis and gas adsorption properties of mesoporous silica-NH2-MIL-53(Al) core-shell spheres" Microporous and Mesoporous Materials. vol. 225. pp. 116-121.
Stavila, V. et al. 2014. "MOF-based electronic and opto-electronic devices." Chem. Soc. Rev. vol. 43. pp. 5994-6010.
Sumida, Kenji et al. "Carbon Dioxide Capture in Metal-Organic Frameworks." 2012. Journal American Chemical Society. vol. 112. pp. 724-781.
Yan, Xinlong et al. 2014. Facile synthesis of mesoporous MOF/silica composites. Royal Society of Chemistry. vol. 4. pp. 57501-57504.
Zhan, Guowu, and Zeng, Hua Chun. 2016. "Integrated nanocatalysts with mesoporous silica/silicate and microporous MOF materials." pp. 1-12.
International Search Report and Written Opinion issued in counterpart PCT Application No. PCT/US2017/046231 dated Nov. 22, 2017 (twenty-one (21) pages).
International Search Report and Written Opinion issued in counterpart PCT Application No. PCT/US2019/023989 dated Aug. 9, 2019.
Koo, Won-Tae, et al. 2017. "Metal-Organic Framework Templated Synthesis of Ultrasmall Catalyst Loaded ZnO/ZnCo2O4 Hollow Spheres for Enhanced Gas Sensing Properties." Scientific Reports. 7:45074, p. 1-10. Published Mar. 22, 2017.
Luz, Ignacio, et al. 2018. "Transformation of single MOF nanocrystals into single nanostructured catalysts within nesoporous supports: a

(56) References Cited

OTHER PUBLICATIONS platform for pioneer fluidized-nanoreactor hydrogen carriers." Royal Society of Chemistry. vol. 54, 8462-8465. Published online Jul. 3, 2018.
Examination Report from European Patent Office in relation to EP application 17754960.7-1105, dated Mar. 19, 2020.
Karimi, Z., et al. "Modulated formation of metal-organic frameworks by oriented growth over mesoporous silica." J. Mater. Chem. A, Mar. 7, 2013, 3047-3054, 1 (9), Royal Society of Chemistry (RSC), United Kingdom.
Karimi, Z., et al.: "Electronic Supplementary Material (ESI)—Modulated formation of metal-organic frameworks by oriented growth over mesoporous silica," J. Mater. Chem. A, 2013, 2 pages, 1 (9), RSC, United Kingdom.
Liu, Y., et ai. "Synthesis of continuous MOF-5 membranes on porous a-alumina substrates." Microporous and Mesoporous Materials, Feb. 2009, pp. 296-301, 118 (1-3), Elsevier, Amsterdam.
Furtado, M. et al. "Mesoporous silica-metal organic composite: synthesis, characterization, and ammonia adsorption." J. Mater. Chem., Mar. 30, 2011, 6698-6706, 21 (18), RSC, United Kingdom.
Yan, X., et al. "Facile synthesis of mesoporous MOF/silica composites." RSC Adv., Oct. 29, 2014, 57501-57504, 4 (101), RSC, United Kingdom.
Yan, X., et al. "Electronic Supplementary Material (ESI)—Facile synthesis of mesoporous MOF/silica composites." RSC Adv., 2014, 5 pages, 4 (101), RSC, United Kingdom.
Sorribas, S., et al. "Synthesis and gas adsorption properties of mesoporous silica-NH2-MIL-53(Al) core-shell spheres." Microporous and Mesoporous Materials, May 1, 2016, 116-121, 225, Elsevier, Amsertdam.
International Preliminary Report on Patentability from International Bureau of WIPO for related application PCT/US2019/023989 dated Sep. 29, 2020 (9 pages).
Examination Report from Indian Patent Office for related application IN 201917002759 dated Nov. 24, 2020 (6 pages).
Foreign office action in related Japanese application No. 2019-502086 dated Mar. 16, 2021 with English Translation. (8 pages).
Nonfinal office action in related U.S. Appl. No. 17/041,944 dated May 14, 2021, (11 pages).
Circujano et al., Boosting the Catalytic Performance of Metal-Organic Frameworks for Steroid Transformations by Confinement within a Mesoporous Scaffold, Angewandte Chemie International Edition, Sep. 1, 2017, 13302-13306, 56(43), John Wiley & Sons, Inc., Hoboken. (20 pages).
Luz et al, Confining Metal-Organic Framework nanocrystals within mesoporous materials: a general approach via a solid-state synthesis, Chem. Mater., Aug. 2017, 9628-9638, 29, Royal Society of Chemistry, Washington, D.C. with supplementary material. (65 pages).
Wu et al, Facile synthesis of MOF-5 confined in SBA-15 hybrid material with enhanced hydrostability, Chem. Comm., 2013, 1133-1240, 49(12), Royal Society of Chemistry, Washington, D.C. (6 pages).
Foreign Office Action in related European Patent Application 17754960.7 dated Jun. 4, 2021. (5 pages).
Extended European Search Report dated Nov. 19, 2021 for associated European Application No. 19776162.0 (10 pages).
Notice of Allowance dated Dec. 10, 2021 for associated U.S. Appl. No. 17/041,944 (10 pages).
Examination Report No. 2 dated Dec. 1, 2021 for associated Australian Patent Application No. 2017311400 (3 pages).
Office Action in related Chinese Application No. 2017800480299 dated Sep. 16, 2021.
Office Action in related Korean Application No. 10-2019-7005796 dated Sep. 30, 2021.
Chakraborty, A, et al. "Mg-MOF-74@SBA-15 hybrids: Synthesis, characterization, and adsorption properties". APL Materials 2, 124107 (2014)(7 pages).

Kondo, A., et al. New insight into mesoporous silica for nano metal-organic framework. J Colloid Interface Sco, 384 (1), 110-115 (2012).
Examination Report in related Australian application No. 2017311400 dated Jul. 29, 2021.
Office Action dated Jan. 25, 2022 for associated Saudi Arabia Patent Application No. 519400983 (8 pages).
Notice of Allowance dated Mar. 29, 2022 for associated U.S. Appl. No. 17/041,944 (20 pages).
Office Action dated Apr. 1, 2022 for associated Korean Patent Application No. 10-2019-7005796 (4 pages).
Office Action dated Aug. 31, 2022 for associated Korean Patent Application No. 10-2022-7019976 (9 pages).
Translation of Office Action dated Aug. 31, 2022 for associated Korean Patent Application No. 10-2022-7019976 (9 pages).
Bielawa, H. et al. "The ammonia-synthesis catalyst of the next generation: Barium-promoted oxide-supported ruthenium." Andewandle Chemie-International Edition 2001, 40, 1061-1063, John Wiley & Sons, Inc., Hoboken, NJ. (3 pages).
Bradzil, J. F. "Designing Multifunctionality into Single Phase and Multiphase Metal-Oxide-Selective Propylene Ammoxidation Catalysts." 2018, 8(3), 103, MDPI, Basel, Switzerland. (19 pages).
Cheddie, D. "Ammonia as a Hydrogen Source for Fuel Cells: A Review" in Minic, D. (Ed.) Hydrogen Energy—Challenges and Perspectives, 2012, 333-361, InTech, London. (31 pages).
Cirujano, F. G. et al. "Boosting the Catalytic Performance of Metal-Organic Frameworks for Steroid Transformations by Confinement within a Mesoporous Scaffold." Angewandte Chemie International Edition, 2017, 56, 13302-13306, John Wiley 8: Sons, Inc., Hoboken, NJ. (7 pages).
Couck, S. et al. "An Amine-Functionalized MIL-53 Metal-Organic Framework with Large Separation Power for CO2 and CH4." J. Am. Chem. Soc. 2009, 131(18), 6326-6327, American Chemical Society (ACS), Washington, D.C. (2 pages).
Cravillon, J. et al. "Rapid Room-Temperature Synthesis and Characterization of Nanocrystals of a Prototypical Zeolitic Imidazolate Framework." Chem. Mater. Mar. 26, 2009, 21(8), 1410-1412, American Chemical Society, Washington, D.C. with Supplement (24 pages).
Debek, R. et al., Maria Elena Galvez, Franck Launay, Monika Motak, Teresa Grzybek & Patrick Da Costa,"Low temperature dry methane reforming over Cr, Zr and CeZr promoted Ni—Mg—Al hydrotalcite-derived catalysts." International Journal of Hydrogen Energy, 2016, 41 (27), 11616-11623, Elsevier, Amsterdam, Netherlands. (9 pages).
Deria, P. et al. "Versatile functionalization of the NU-1000 platform by solvent-assisted ligand incorporation." Chem. Commun., Feb 24, 2014, 50(16), 1965-1968, Royal Society of Chemistry (RSC), London, UK. (5 pages).
Dietzel, P. D. C. et al. "An In Situ High-Temperature Single-Crystal Investigation of a Dehydrated Metal-Organic Framework Compound and Field-Induced Magnetization of One-Dimensional Metal-Oxygen Chains." Angew. Chem., Int. Ed. Oct. 7, 2005, 44 (39), 6354-6358, John Wiley & Sons, Inc., Hoboken, NJ. (5 pages).
Dietzel, P. D. C. et al. "Hydrogen adsorption in a nickel based coordination polymer with open metal sites in the cylindrical cavities of the desolvated frame-work." Chem. Commun. Mar. 7, 2006, 959-961, RSC, London, UK. (3 pages).
Escande, V. Eddy Petit, Laetitia Garoux, Clotilde Boulanger, and Claude Grison, "Switchable Alkene Epoxidation/Oxidative Cleavage with H2O2/NaHCO3: Efficient Heterogeneous Catalysis Derived from Biosourced Eco-Mn." ACS ustainable Chem. Eng., 2015, 3 (11), pp. 2704-2715, ACS, Washington, D.C. (12 pages).
Farrauto, R. J. et al. "Catalytic converters: state of the art and perspectives," Catalysis Today, Jul. 29, 1999, 51(3-4), 351-360, Elsevier, Amsterdam, Netherlands. (10 pages).
Fei, H. et al. "A robust, catalytic metal-organic framework with open 2,2-bipyridine sites." Chem. Commun. May 14, 2014, 50(37), 4810-4812, RSC, London, UK. (3 pages).
Feng, D. el al. "Zirconium-Metalloporphyrin PCN-222: Mesoporous Metal-Organic Frameworks with Ultrahigh Stability as Biomimetic Catalysts." Angew. Chem., Int. Ed. Oct. 8, 2012, 51(41), 10307-10310, John Wiley & Sons, Inc., Hoboken, NJ. (4 pages).

(56) References Cited

OTHER PUBLICATIONS

Ferey, G. et al. "A chromium terephthalate-based solid with unusually large pore volumes and surface area." Science, Sep. 23, 2005, 309(5743), 2040-2042, American Association for the Advancement of Science (AAAS), Washington, D. C. (4 pages).

Gomez-Gualdron, D. A. et al. "Application of Consistency Criteria To Calculate BET Areas of Micro- And Mesoporous Metal-Organic Frameworks." J. Am. Chem. Soc., Jan. 13, 2016, 138(1), 215-224, ACS, Washington, D.C. (10 pages).

Juan-Alcaniz, J. et al. "Towards acid MOFs—catalytic performance of sulfonic acid functionalized architectures." Catal. Sci. Technol. Jun. 4, 2013, 3, 2311-2318, RSC, London, UK. (8 pages).

Kandiah, M. et al. "Synthesis and Stability of Tagged UiO-66 Zr-MOFs." Chem. Mater. Dec. 3, 2010, 22(24), 5632-6640, ACS, Washington, D.C. (9 pages).

Kozachuk, O. et al. "Multifunctional, Defect-Engineered Metal-Organic Frameworks with Ruthenium Centers: Sorption and Catalytic Properties." Angew. Chem., Int. Ed. Jul. 1, 2014, 53(27), 7058-7062, John Wiley & Sons, Inc., Hoboken, NJ. (5 pages).

Lee, K. J. et al. "Transformation of Metal-Organic Frameworks/ Coordination Polymers into Functional Nanostructured Materials: Experimental Approaches Based on Mechanistic Insights," Accounts of Chemical Research Nov. 21, 2017, 50(11), 2684-2692, ACS, Washington, D.C. (9 pages).

Li, P. et al. "Immobilization of Metal-Organic Framework Nanocrystals for Advanced Design of Supported danocatalysts." ACS Applied Materials & Interfaces, Oct. 24, 2016, 8, 29551-29564, ACS, Washington, D.C. with Supplement (31 pages).

Liu, L. et al. "Generation of subnanometric platinum with high stability during transformation of a 2D zeolite into 3D." Nature Materials 2017, 16, 132-138, Springer Nature Limited, Berlin, Germany. (8 pages).

Liu, Q., et al. "Using carbon dioxide as a building block in organic synthesis." Nat Commun, Jan. 20, 2015, 5933, 6, Springer Nature, Berlin. (15 pages).

Long, P. et al. "Solvent effect on the synthesis of MIL-96(Cr) and MIL-100(Cr)." Microporous Mesoporous Mater. Jul. 2011, 142(2-3), 489-493, Elsevier, Amsterdam, Netherlands. (5 pages).

Masoomi, M. Y. et al. "Applications of metal-organic coordination polymers as precursors for preparation of anomaterials." Coordination Chemistry Reviews, Dec. 2012, 256 (23-24), 2921-2943, Elsevier, Amsterdam, Netherlands. (23 pages).

McDonald el al. "Cooperative insertion of CO2 in diamine-appended metal-organic frameworks." Nature, Mar. 19, 2015, 519 (7543), 303-308, Springer Nature Limited, Berlin, Germany. (30 pages).

Ocampo, F. et al. "CO2 methanation over Ni-Ceria-Zirconia catalysts: effect of preparation and operating conditions." IOP Conf. Series: Materials Science and Engineering, 2011, 19, 012007, IOP Publishing, Bristol, United Kingdom. (12 pages).

Preuster, P. el al. "Liquid Organic Hydrogen Carriers (LOHCs): Toward a Hydrogen-free Hydrogen Economy." Accounts of Chemical Research, 2017, 50(1), 74-85, ACS, Washington, D.C. (12 pages).

Prieto, G. et al. "Towards stable catalysts by controlling collective properties of supported metal nanoparticles." Nature Materials 2013, 12, 34-39, Springer Nature Limited, Berlin, Germany. with Supplementary (31 pages).

Ravi, M., Marco Ranocchiari and Jeroen A. van Bokhoven Angew. "The Direct Catalytic Oxidation of Methane to Methanol—A Critical Assessment." Chem. Int. Ed. 2017, 56, 16464-16483, John Wiley & Sons, Inc., Hoboken, NJ. (20 pages)

Serre, C. et al. "Very Large Breathing Effect in the First Nanoporous Chromium(III)-Based Solids: MIL-53 or CrIII(OH) (O2C-C6H4-CO2} {HO2C-C6H4-CO2H}x-H2Oy." J. Am. Chem. Soc., Nov. 13, 2002, 124(45), 13519-13526, ACS, Washington, D.C. (8 pages)

Servalli, M.; Ranocchiari, M.; Van Bokhoven, J. A.: "Fast and high yield post-synthetic modification of metal-organic frameworks by vapor diffusion." Chemical Communications 2012, 48, 1904-1906, RSC, London, UK. (3 pages).

Tang, J. et al. "Bimetallic Metal-Organic Frameworks for Controlled Catalytic Graphitization of Nanoporous Carbons." Scientifc Reports 2016, 6, 30295, Springer Nature Limited, Berlin, Germany. (8 pages)

Tsuji, Y., et al. "Ammonia synthesis over Co—Mo alloy nanoparticle catalyst prepared via sodium naphthalenide-deriven reduction" Chem. Commun., 2016, 14369-14372, 52(100), RSC, London, UK. (5 pages).

Volkringer, C. et al. "Synthesis, Single-Crystal X-ray Microdiffraction, and NMR Characterizations of the Giant Pore Metal-Organic Framework Aluminum Trimesate MIL-100." Chem. Mater. 2009, 21, 5695-5697, ACS, Washington, D.C. (3 pages).

Wei, J. et al. "Directly converting CO2 into a gasoline fuel." Nat. Commun, May 2, 2017, 8, 15174-15182, Springer Nature Limited, Berlin, Germany. (8 pages).

Wezendonk, T. A. et al. "Elucidating the Nature of Fe Species during Pyrolysis of the Fe-BTC MOF into Highly Active and Stable Fischer-Tropsch Catalysts."ACS Catalysis 2016, 6 (5), 3236-3247, ACS, Washington, D.C. (13 pages).

Zhang, X. et al. "Gold(III)—Metal Organic Framework Bridges the Gap between Homogeneous and Heterogeneous Gold Catalysts." Journal of Catalysis, Jul. 25, 2009, 265(2), 155-160, Elsevier, Amsterdam, Netherlands. (6 pages).

Zhao, D. Y. et al. "Triblock copolymer syntheses of mesoporous silica with periodic 50 to 300 angstrom pores." Science, Jan. 23, 1998, 279(5350), 548-552, AAAS, Washington, D.C. (5 pages).

Dejong, K.P. et al, The platinum rush, Porous Catalysts, Jan. 2017, 16, 7-8, Nature Materials, Springer Nature Limited, Berlin, Germany. (2 pages).

Foreign Office Action for related Japanese patent application 2019-502086 dated Nov. 8, 2016, dated Mar. 16, 2021. (3 pages).

Koo et al., Metal-Organic Framework Templated Synthesis of Ultrasmall Catalyst Loaded ZnO/ZnCo2O4 Hollow Spheres for Enhanced Gas Sensing Properties, Nature, Mar. 22, 2017, 7, 45074, Springer Nature Limited, Berlin, Germany. (10 pages).

Notification of Reasons for Refusal dated Jan. 24, 2023 for associated Japanese Patent Application No. 2021-179381 with translation (5 pages).

* cited by examiner

100 μm

100 μm

100 μm

100 μm

1 µm

1 µm 20 nm 20 nm

100 μm

5 μm

SOLID-STATE CRYSTALLIZATION OF METAL ORGANIC FRAMEWORKS WITHIN MESOPOROUS MATERIALS METHODS AND HYBRID MATERIALS THEREOF

CROSS REFERENCE TO RELATED APPLICATIONS

This is a 371 national stage patent application, which claims priority to PCT International Patent Application No. PCT/US2017/046231, filed Aug. 10, 2017, and titled SOLID-STATE CRYSTALLIZATION OF METAL ORGANIC FRAMEWORKS WITHIN MESOPOROUS MATERIALS METHODS AND HYBRID MATERIALS THEREOF, which claims the benefit of U.S. Provisional Patent Application No. 62/373,047, filed Aug. 10, 2016, Ignacio Luz, which are hereby incorporated herein by reference in their entireties.

STATEMENT REGARDING FEDERALLY SPONSORED RESEARCH OR DEVELOPMENT

This invention was made with government support under DE-FE0026432 awarded by Department of Energy. The government has certain rights in the invention.

1. FIELD

The present disclosure relates to a general method for the solid-state crystallization of metal organic frameworks (MOFs) within the pore spaces of mesoporous materials (MPMs) in the absence of solvent. Additionally, the present disclosure relates to hybrid metal organic framework (MOF) and mesoporous material (MPM) hybrid materials (MOF/MPM) generated therefrom.

2. BACKGROUND

2.1. Introduction

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

During the last decade, rational design of very sophisticated hybrid materials based on metal organic frameworks (MOFs) as functional species blended with different supports (such as metals, metal oxides, carbon, and polymers) has emerged as a general strategy for integrating their most interesting properties (such as elevated surface areas, well-defined active sites, highly-designed functionality, etc.) while enhancing their weaknesses as single components (such as handling, mechanical/thermal/chemical resistance, conductivity, etc.) and further adding extra synergistic properties which arise from the intimate interactions and complex hierarchical architectures of the resulting composites (such as micro/meso-porosity, multi-functionality, etc.). Thus, hybrid materials in which MOFs are embedded into one continuous matrix have been applied to several applications such as gas adsorption/separation, drug delivery, proton conductivity, sensors, optoelectronics, and heterogeneous catalysis.

Metal organic frameworks (MOFs) have been widely supported on different surface by the blending method or the solvothermal "in situ" growth method. The blending method consists of the impregnation of pre-synthesized nano-crystalline MOFs on different surfaces while the "in situ" technique requires a pre-modification of the surface of the support by functional groups (i.e. grafting) or the use of tedious techniques (such as atomic layer deposition of metal oxides or layer by layer crystallization) which are difficult to scale up. Nevertheless, these complex techniques are restricted to a few MOF/MPM examples such as MOF-5/$SiO_2$, (Mg)MOF-74/SBA-15, SIM-1/$\gamma$-$Al_2O_3$, (Cu)HKUST-1/$SiO_2$ and (Cu)HKUST-1/$\gamma$-$Al_2O_3$ and the growth or the deposition of these MOFs have been done mainly on the external surface (i.e. in a non-porous manner or not inside the pores of the supports) of the supports. Despite these efforts, a universal, efficient, environmental friendly and inexpensive method for loading MOFs on mesoporous materials is highly of interest to meet the industrial demands and the diverse applications of these hybrid materials.

The following references are incorporated herein by reference in their entirety:

Doherty, C. M.; Buso, D.; Hill, A. J.; Furukawa, S.; Kitagawa, S.; Falcaro, P.: Using Functional Nano- and Microparticles for the Preparation of Metal-Organic Framework Composites with Novel Properties. *Accounts of Chemical Research* 2014, 47, 396-405.

Zhan, G.; Zeng, H. C.: Integrated nanocatalysts with mesoporous silica/silicate and microporous MOF materials. *Coordination Chemistry Reviews* 2016, 320-321, 181-192.

Zhou, H.-C.; Long, J. R.; Yaghi, O. M.: Introduction to Metal-Organic Frameworks. *Chemical Reviews* 2012, 112, 673-674.

Li, Z.; Zeng, H. C.: Armored MOFs: Enforcing Soft Microporous MOF Nanocrystals with Hard Mesoporous Silica. *Journal of the American Chemical Society* 2014, 136, 5631-5639.

Wu, C. M.; Rathi, M.; Ahrenkiel, S. P.; Koodali, R. T.; Wang, Z. Q.: Facile synthesis of MOF-5 confined in SBA-15 hybrid material with enhanced hydrostability. *Chemical Communications* 2013, 49, 1223-1225.

Yang, L. J.; Tang, B. B.; Wu, P. Y.: Metal-organic framework-graphene oxide composites: a facile method to highly improve the proton conductivity of PEMs operated under low humidity. *Journal of Materials Chemistry A* 2015, 3, 15838-15842.

Li, S. Z.; Huo, F. W.: Metal-organic framework composites: from fundamentals to applications. *Nanoscale* 2015, 7, 7482-7501.

Furukawa, H.; Cordova, K. E.; O'Keeffe, M.; Yaghi, 0. M.: The Chemistry and Applications of Metal-Organic Frameworks. *Science* 2013, 341, 974-+.

Silva, P.; Vilela, S. M. F.; Tome, J. P. C.; Paz, F. A. A.: Multifunctional metal-organic frameworks: from academia to industrial applications. *Chemical Society Reviews* 2015, 44, 6774-6803.

Li, J. R.; Ma, Y. G.; McCarthy, M. C.; Sculley, J.; Yu, J. M.; Jeong, H. K.; Balbuena, P. B.; Zhou, H. C.: Carbon dioxide capture-related gas adsorption and separation in metal-organic frameworks. *Coordination Chemistry Reviews* 2011, 255, 1791-1823.

Sumida, K.; Rogow, D. L.; Mason, J. A.; McDonald, T. M.; Bloch, E. D.; Henn, Z. R.; Bae, T. H.; Long, J. R.: Carbon Dioxide Capture in Metal-Organic Frameworks. *Chemical Reviews* 2012, 112, 724-781.

Li, J. R.; Sculley, J.; Zhou, H. C.: Metal-Organic Frameworks for Separations. *Chemical Reviews* 2012, 112, 869-932.

Della Rocca, J.; Liu, D.; Lin, W.: Nanoscale Metal-Organic Frameworks for Biomedical Imaging and Drug Delivery. *Accounts of Chemical Research* 2011, 44, 957-968.

Goesten, M. G.; Juan-Alcaniz, J.; Ramos-Fernandez, E. V.; Gupta, K. B. S. S.; Stavitski, E.; van Bekkum, H.; Gascon, J.; Kapteijn, F.: Sulfation of metal-organic frameworks: Opportunities for acid catalysis and proton conductivity. *Journal of Catalysis* 2011, 281, 177-187.

Kreno, L. E.; Leong, K.; Farha, O. K.; Allendorf, M.; Van Duyne, R. P.; Hupp, J. T.: Metal-Organic Framework Materials as Chemical Sensors. *Chemical Reviews* 2012, 112, 1105-1125.

Stavila, V.; Talin, A. A.; Allendorf, M. D.: MOF-based electronic and opto-electronic devices. *Chemical Society Reviews* 2014, 43, 5994-6010.

Corma, A.; Garcia, H.; Llabres i Xamena, F. X. L. I.: Engineering Metal Organic Frameworks for Heterogeneous Catalysis. *Chemical Reviews* 2010, 110, 4606-4655.

F. X. Llabrés i Xamena, J. G.: *Metal Organic Frameworks as Heterogeneous Catalysts*; The Royal Society of Chemistry (Cambrigde) 2014.

Stock, N.; Biswas, S.: Synthesis of Metal-Organic Frameworks (MOFs): Routes to Various MOF Topologies, Morphologies, and Composites. *Chemical Reviews* 2012, 112, 933-969.

Buso, D.; Nairn, K. M.; Gimona, M.; Hill, A. J.; Falcaro, P.: Fast Synthesis of MOF-5 Microcrystals Using Sol-Gel SiO2 Nanoparticles. *Chemistry of Materials* 2011, 23, 929-934.

Chakraborty, A.; Maji, T. K.: Mg-MOF-74@SBA-15 hybrids: Synthesis, characterization, and adsorption properties. *Apl Materials* 2014, 2.

Aguado, S.; Canivet, J.; Farrusseng, D.: Engineering structured MOF at nano and macroscales for catalysis and separation. *Journal of Materials Chemistry* 2011, 21, 7582-7588.

Yan, X. L.; Hu, X. Y.; Komarneni, S.: Facile synthesis of mesoporous MOF/silica composites. *Rsc Advances* 2014, 4, 57501-57504.

Ulker, Z.; Erucar, I.; Keskin, S.; Erkey, C.: Novel nanostructured composites of silica aerogels with a metal organic framework. *Microporous and Mesoporous Materials* 2013, 170, 352-358.

Qin, L.; Zhou, Y.; Li, D.; Zhang, L.; Zhao, Z.; Zuhra, Z.; Mu, C.: Highly Dispersed HKUST-1 on Milimeter-Sized Mesoporous γ-$Al_2O_3$ Beads for Highly Effective Adsorptive Desulfurization. *Industrial & Engineering Chemistry Research* 2016, 55, 7249-7258.

Sanchez-Sanchez, M.; Getachew, N.; Diaz, K.; Diaz-Garcia, M.; Chebude, Y.; Diaz, I.: Synthesis of metal-organic frameworks in water at room temperature: salts as linker sources. *Green Chemistry* 2015, 17, 1500-1509.

Klimakow, M.; Klobes, P.; Thunemann, A. F.; Rademann, K.; Emmerling, F.: Mechanochemical Synthesis of Metal-Organic Frameworks: A Fast and Facile Approach toward Quantitative Yields and High Specific Surface Areas. *Chemistry of Materials* 2010, 22, 5216-5221.

Tranchemontagne, D. J.; Hunt, J. R.; Yaghi, O. M.: Room temperature synthesis of metal-organic frameworks: MOF-5, MOF-74, MOF-177, MOF-199, and IRMOF-0. *Tetrahedron* 2008, 64, 8553-8557.

Chen, Y.; Yang, C. Y.; Wang, X. Q.; Yang, J. F.; Ouyang, K.; Li, J. P.: Kinetically controlled ammonia vapor diffusion synthesis of a Zn(II) MOF and its H2O/NH3 adsorption properties. *Journal of Materials Chemistry A* 2016, 4, 10345-10351.

Luz, I.; Loiudice, A.; Sun, D. T.; Queen, W. L.; Buonsanti, R.: Understanding the Formation Mechanism of Metal Nanocrystal@MOF-74 Hybrids. *Chemistry of Materials* 2016, 28, 3839-3849

3. SUMMARY OF THE DISCLOSURE

According to a first aspect, the present disclosure relates to a method, comprising i) contacting an aqueous solution of an organic ligand salt of the formula $A_x(L^{-x})$ with a mesoporous material (MPM) to form an impregnated mesoporous salt material of the formula $A_x(L^{-x})$/MPM where A is a counter ion, x is a whole number, and L is an organic ligand, ii) treating the impregnated mesoporous salt material with an aqueous acidic solution to form an impregnated mesoporous acid material of the formula $H_x(L^{-x})$/MPM where H is hydrogen, iii) contacting an aqueous solution of a metal precursor of the formula $M^{+y}(B)_y$ with the impregnated mesoporous acid material to form an impregnated mesoporous metal organic framework precursor of the formula $[M^{+y}(B)_y][H_x(L^{-x})]$/MPM where M is a metal, y is a whole number, and B is an anion; and iv) at least one of 1) heating the impregnated mesoporous metal organic framework precursor in the absence of a solvent or 2) exposing the impregnated mesoporous metal organic framework precursor to a volatile vapor in the absence of a solvent such that the heating or the exposing forms a hybrid material of the formula $(M^{+y}L^{-x})$/MPM, wherein the hybrid material comprises a nano-crystalline metal organic framework (MOF) embedded within the mesoporous material.

According to a second aspect, the present disclosure relates to a hybrid material comprising i) a mesoporous material comprising mesopores and ii) a nano-crystalline metal organic framework comprising micropores, wherein the nano-crystalline metal organic framework is homogeneously dispersed and substantially present within the mesopores or void spaces of the mesoporous material, and wherein the hybrid material has a weight percentage of the metal organic framework in the range of 5-50% relative to the total weight of the hybrid material.

The foregoing paragraphs have been provided by way of general introduction, and are not intended to limit the scope of the following claims. The described embodiments, together with further advantages, will be best understood by reference to the following detailed description taken in conjunction with the accompanying drawings. It is to be understood, that both the foregoing general description and the following detailed description are exemplary, but are not restrictive.

4. BRIEF DESCRIPTION OF THE FIGURES

A more complete appreciation of the disclosure and many of the attendant advantages thereof will be readily obtained as the same becomes better understood by reference to the following detailed description when considered in connection with the accompanying drawings, wherein:

Table 1 is an example of the versatility and scope of the solid-state crystallization of MOFs within Silica(A) (Hyper-MOF-X).

Table 2 is an example of the versatility and scope of the solid-state crystallization of MOFs within different mesoporous supports.

Figure 17:
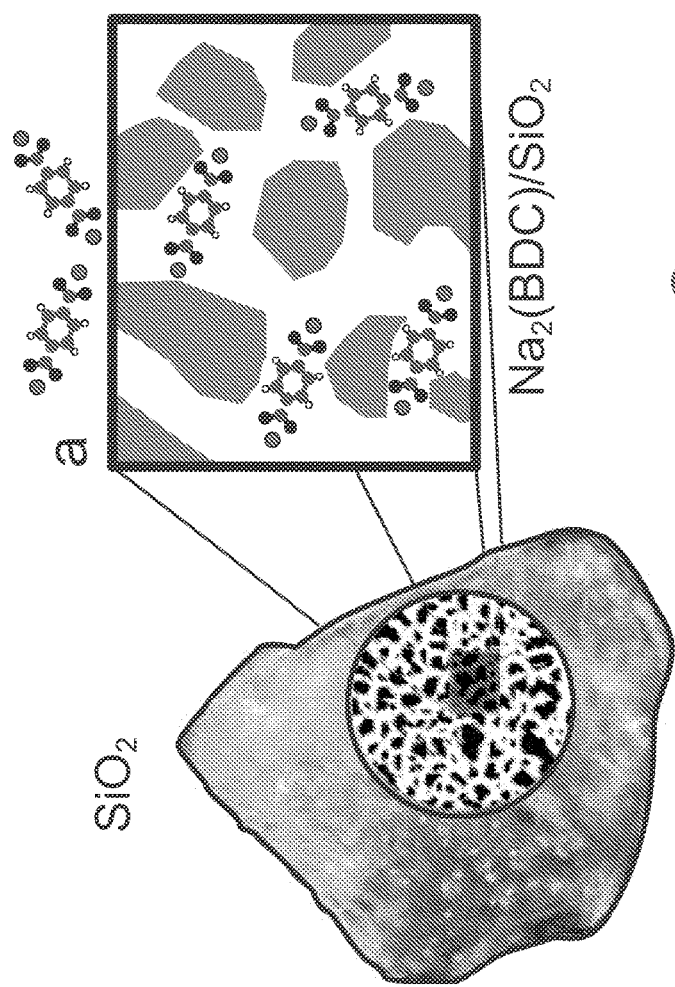
Figure 17:
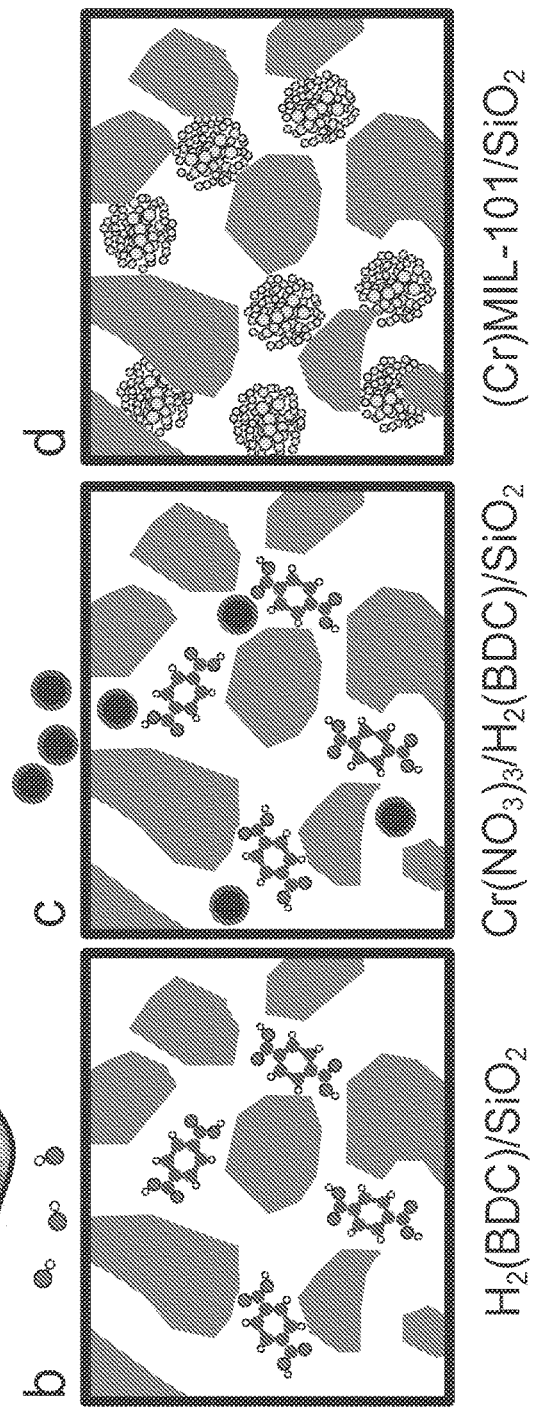

FIG. 17 is a scheme describing one embodiment of the solid-state crystallization approach. First step, ligand salt impregnation (a). Second step, gas phase acidification (b). Third step, metal salt impregnation (c). Final step, application of synthesis conditions and crystallization of MOF nanocrystals (d).

5. DETAILED DESCRIPTION OF THE DISCLOSURE

Referring now to the drawings, embodiments of the present disclosure will now be described more fully hereinafter with reference to the accompanying drawings, in which some, but not all of the embodiments of the disclosure are shown.

In one embodiment of the present disclosure, several hybrid materials have been prepared by a novel approach which consists of the 'in situ' crystallization of metal organic frameworks (MOFs) within mesoporous materials via self-assembly of pre-impregnated MOF precursors (metal and organic ligand) on the cavities of MPMs under the absence of solvent. This novel and inexpensive approach is provided for efficient, scalable and environmentally friendly synthesis of hybrid compounds based on nano-crystalline metal organic frameworks (MOFs) embedded within mesoporous materials (MPMs). These hybrid materials can be highly designed to exhibit elevated MOF loading (up to 35-40%), excellent MOF dispersion and homogeneity, tunable hierarchical micro (MOF; ranging from 0.5-5.0 nm) and meso (MPM; ranging from 2-50 nm) pore size distribution, elevated surface areas (up to 900-1200 $m^2/g$), nano-metric MOF particles (below 30 nm), enhanced attrition resistance, good fluidizability as well as handling (100-500 μm).

Herein, the present disclosure describes the first promising discovery of a 'solid phase' crystallization technique which allows homogeneous growth of different MOF structures with a series of commercially available mesoporous materials regardless of their nature (silica, alumina, zeolite, carbon, polymer, etc.), pore architecture (size, pore distribution, etc.) or surface functionality (acidic, basic, etc.). The absence of solvent during the crystallization restricts the crystal growth, size, and mobility to just the void space (inside the pores) where the precursors were previously confined, thus overcoming the limitations found when typical solvothermal methods are applied, even when using grafted functional groups (i.e. carboxylic or amine). In particular, typical solvothermal methods are limited by formation of extra MOF crystallites out of the pore system which can be washed out or remain as aggregates on the outer surface, and therefore reduce the yield of the synthesis and the resulting MOF loading on the MPMs. Thus, more mechanically stable, well-defined, highly designed and multifunctional materials can be provided by the general approach described in the present disclosure in order to meet the emergence of novel hybrid MOF/MPM applications.

Furthermore, the use of the novel approach of the present disclosure provides high and homogeneous loading of MOF nanocrystals within MPMs achieved via a "multistep" impregnation of saturated aqueous solutions containing the MOF precursors: metal salt, and in the present disclosure ligand salt, instead of the acid form. The acid form of the organic ligands is widely used for MOF synthesis, but it exhibits very low solubility in either water or even organic solvents (i.e. terephthalic or trimesic acid), which prevents the high loading of MOF precursors required for the 'in-situ' growth of MOFs within the pores of the MPMs in the 'solid-state' crystallization described herein. An acidification step between the initial impregnation of the ligand salt solution and the metal salt solution within the MPM cavities is performed to prevent the formation of non-porous coordination polymers due to the fast polymerization rates upon addition of the metal salts in solution even at room temperature. Although the preparation of free-standing (or bulk) MOFs under dry conditions has been demonstrated, the present disclosure provide the first 'solid phase' or 'dry' crystallization of MOFs on MPMs using water soluble ligand salts.

According to a first aspect, the present disclosure relates to a method, comprising i) contacting an aqueous solution of an organic ligand salt of the formula $A_x(L^{-x})$ with a mesoporous material (MPM) to form an impregnated mesoporous salt material of the formula $A_x(L^{-x})$/MPM, ii) treating the impregnated mesoporous salt material with an aqueous acidic solution to form an impregnated mesoporous acid material of the formula $H_x(L^{-x})$/MPM, iii) contacting an aqueous solution of a metal precursor of the formula $M^{+y}(B)_y$ with the impregnated mesoporous acid material to form an impregnated mesoporous metal organic framework precursor of the formula $[M^{+y}(B)_y][H_x(L^{-x})]$/MPM, and iv) heating the impregnated mesoporous metal organic framework precursor in the absence of a solvent or exposing the impregnated mesoporous metal organic framework precursor to a volatile vapor in the absence of a solvent to form a hybrid material of the formula $(M^{+y}L^{-x})$/MPM, wherein the hybrid material comprises a nano-crystalline metal organic framework (MOF) embedded within the mesoporous material.

In a first step, an aqueous solution of an organic ligand salt of the formula $A_x(L^{-x})$ is contacted with a mesoporous material (MPM) present at a concentration in the range of 10-300 mg/mL, preferably 25-275 mg/mL, preferably 50-250 mg/mL to form an impregnated mesoporous salt material of the formula $A_x(L^{-x})$/MPM. Exemplary salts include, but are not limited to, mineral or organic acid salts of basic groups such as amines, and alkali or organic salts of acidic groups such as carboxylic acids. The salts include, but are not limited to, the conventional non-toxic salts or the quaternary ammonium salts of the parent compound formed, for example, from non-toxic inorganic or organic acids. Salts of carboxylic acid containing ligands may include cations such as lithium, sodium, potassium, magnesium, additional alkali metals, and the like. The salts include, but are not limited to, the conventional non-toxic salts or the quaternary ammonium salts of the parent compound formed, for example, from non-toxic inorganic or organic acids. In a preferred embodiment, the salts are alkali metal salts, most preferably sodium salts. In a preferred embodiment, the contacting is performed at a temperature of up to 80° C., preferably 10-80° C., preferably 15-60° C., preferably 20-40° C., preferably 22-30° C., or about room temperature and has a contacting time of up to 48 hours, preferably 0.5-36 hours, preferably 1-24 hours, preferably 2-12 hours, preferably 2.5-8 hours, preferably 3-6 hours. In some embodiments, the ligand (i.e. acid form; 2,6-dihydoxyterephthalic acid) may be dissolved and impregnated in water or organic solvents. Exemplary organic solvents include, but are not limited to, methanol, ethanol, tetrahydrofuran, N,N-dimethylformamide, acetonitrile, acetone, and the like.

In a second step, the impregnated mesoporous salt material present at a concentration in the range of 10-300 mg/mL, preferably 25-275 mg/mL, preferably 50-250 mg/mL is treated with an aqueous acidic solution of 0.05-10.0 M in concentration, preferably 0.1-9.0 M, preferably 1.0-8.0M, preferably 2.0-6.0 M, or about 4.0 M to form an impregnated mesoporous acid material of the formula $H_x(L^{-x})$/MPM. Strong acids including, but not limited to, HCl, $H_2SO_4$, and $HNO_3$ are preferred, but organic acids and weak acids (i.e. acetic acid) may also be used in the treating, most preferably HCl. In a preferred embodiment, the treating is performed at a temperature of up to 80° C., preferably 10-80° C., preferably 15-60° C., preferably 20-40° C., preferably 22-30° C., or about room temperature and has a treating time of up to 48 hours, preferably 0.5-36 hours, preferably 1-24 hours, preferably 2-12 hours, preferably 2.5-8 hours, preferably 3-6 hours.

In a third step, the impregnated mesoporous acid material present at a concentration in the range of 10-300 mg/mL, preferably 25-275 mg/mL, preferably 50-250 mg/mL is contacted with an aqueous solution of a metal precursor of the formula $M^{+y}(B)_y$ to form an impregnated mesoporous metal organic framework precursor of the formula $[M^{+y}(B)_y][H_x(L^{-x})]$/MPM. In a preferred embodiment, the contacting is performed at a temperature of up to 80° C., preferably 10-80° C., preferably 15-60° C., preferably 20-40° C., preferably 22-30° C., or about room temperature and has a contacting time of up to 48 hours, preferably 0.5-36 hours, preferably 1-24 hours, preferably 2-12 hours, preferably 2.5-8 hours, preferably 3-6 hours.

In a final step the impregnated mesoporous metal organic framework precursor present at a concentration in the range of 10-300 mg/mL, preferably 25-275 mg/mL, preferably 50-250 mg/mL is heated in the absence of a solvent or exposed to a volatile vapor (i.e. and amine such as methylamine or controlled moisture such as steam) in the absence of a solvent to form a hybrid material of the formula $(M^{+y}L^{-x})$/MPM, or hereafter called MOF/MPM. In this step, the metal ions form coordinate bonds with the one or more organic ligands, preferably multidentate organic ligands to form a nano-crystalline metal organic framework in the pore spaces of the mesoporous material. In a preferred embodiment, the heating is performed at a temperature of up to 300° C., preferably 40-250° C., preferably 60-220° C., preferably 100-200° C., preferably 120-190° C., and has a heating time of up to 60 hours, preferably 12-48 hours, preferably 24-36 hours. In a preferred embodiment, the exposing to a vapor is performed at a temperature of up to 80° C., preferably 10-80° C., preferably 15-60° C., preferably 20-40° C., preferably 22-30° C., or about room temperature and has a heating time of up to 48 hours, preferably 6-36 hours, preferably 12-24 hours. In certain embodiments, a catalytic amount of a specific additive including (preferably 15%), but not limited to, methanol, ethanol, tetrahydrofuran, N,N-dimethylformamide, and the like may be employed to assist the crystal formation within the hybrid material.

In certain embodiments, the nano-crystalline metal organic framework is present only within the mesopores or void spaces of the mesoporous material and homogeneously dispersed within the mesopores or void spaces of the mesoporous material. As used herein, "disposed on", "embedded" or "impregnated" describes being completely or partially filled throughout, saturated, permeated and/or infused. The nano-crystalline MOF may be affixed substantially within the pore space of the mesoporous material. The nano-crystalline MOF may be affixed to the mesoporous material in any reasonable manner, such as physisorption or chemisorption and mixtures thereof. In one embodiment, greater than 10% of the pore spaces of the mesoporous material is covered by the nano-crystalline MOF, preferably greater than 15%, preferably greater than 20%, preferably greater than 25%, preferably greater than 30%, preferably greater than 35%, preferably greater than 40%, preferably greater than 45%, preferably greater than 50%, preferably greater than 55%, preferably greater than 60%, preferably greater than 65%, preferably greater than 70%, preferably greater than 75%, preferably greater than 80%, preferably greater than 85%, preferably greater than 90%, preferably greater than 95%, preferably greater than 96%, preferably greater than 97%, preferably greater than 98%, preferably greater than 99%. In certain embodiments, the nano-crystalline metal organic framework is substantially present only within the mesopores or void spaces of the mesoporous material and homogeneously dispersed within the mesopores or void spaces of the mesoporous material, preferably greater than 60% of the nano-crystalline MOF is located in the pore spaces and not at the surface of the mesoporous material, preferably greater than 70%, preferably greater than 75%, preferably greater than 80%, preferably greater than 85%, preferably greater than 90%, preferably greater than 95%, preferably greater than 96%, preferably greater than 97%, preferably greater than 98%, preferably greater than 99%. As used herein, homogeneous dispersion refers to dispersion in a similar or the same manner and may refer to uniform structure and composition. In a preferred embodiment, the hybrid material is substantially free of MOF aggregates or an amorphous MOF phase and substantially comprises MOF particles as a nano-crystalline phase dispersed in a uniform manner throughout the pore spaces of the mesoporous material.

In certain embodiments, the method further comprises drying at least one selected from the group consisting of the impregnated mesoporous salt material, the impregnated mesoporous acid material, the impregnated mesoporous metal organic framework precursor, and the hybrid material at a temperature in the range of 25–160° C., preferably 85-150° C., preferably 90-140° C., preferably 100-130° C., or about 120° C. under a vacuum and with a drying time of up to 24 hours, preferably 0.5-18 hours, preferably 1-12 hours, preferably 1.5-6 hours, or about 2 hours.

In certain embodiments, the method further comprises washing the hybrid material with distilled water or other polar protic solvent, and extracting water from the hybrid material in a Soxhlet system recycling methanol or other polar protic solvent.

In a preferred embodiment, the mesoporous material is at least one selected from the group consisting of a mesoporous metal oxide (aluminum oxide, cerium oxide, titanium oxide, zirconium oxide, magnesium oxide, etc.), a mesoporous silica, a mesoporous carbon, a mesoporous polymer, a mesoporous silicoalumina (zeolite), a mesoporous organosilica, and a mesoporous aluminophosphate, etc.). As used herein, a mesoporous material may refer to a material containing pores with diameters between 2-50 nm, porous materials are classified into several kinds by their pore size. In a preferred embodiment, the mesoporous material has a percent porosity of greater than 10%, preferably greater than 20%, preferably greater than 25%, preferably greater than 30%, preferably greater than 35%, preferably greater than 40%

In a preferred embodiment, the organic ligand ($L^{-x}$) of the organic ligand salt is at least one selected from the group consisting of polycarboxylate ligands, azaheterocyclic ligands, and derivatives thereof. As used herein, "ligand" refers to a mono-dentate or polydentate compound that bind a transition metal or a plurality of transition metals, respectively. Generally a linking moiety comprises a substructure covalently linked to an alkyl or cycloalkyl group, comprising 1 to 20 carbon atoms, an aryl group comprising 1 to 5 phenyl rings, or an alkyl or aryl amine comprising alkyl or cycloalkyl groups having from 1 to 20 carbon atoms or aryl groups comprising 1 to 5 phenyl rings, and in which a linking cluster (e.g., a multidentate function groups) are covalently bound to the substructure. A cycloalkyl or aryl substructure may comprise 1 to 5 rings that comprise either of all carbon or a mixture of carbon with nitrogen, oxygen, sulfur, boron, phosphorus, silicon and/or aluminum atoms making up the ring. Typically the linking moiety will comprise a substructure having one or more carboxylic acid linking clusters covalently attached.

In a preferred embodiment, the organic ligand ($L^{-x}$) of the organic ligand salt is at least one selected from the group consisting of, terephthalate, benzene-1,3,5-tricarboxylate, 2,5-dioxibenzene dicarboxylate, biphenyl-4,4'-dicarboxylate and derivatives thereof. In a preferred embodiment, the organic ligand ($L^{-x}$) of the organic ligand salt is at least one selected from the group consisting of imidazolate, pyrimidine-azolate, triazolate, tetrazolate and derivatives thereof. Additional suitable exemplary ligands include, but are not limited to, bidentate carboxylics (i.e. oxalic acid, malonic acid, succinic acid, glutaric acid, phthalic acid, isophthalic acid, terepthalic acid), tridentate carboxylates (i.e. citric acid, trimesic acid), azoles (i.e. 1,2,3-triazole, pyrrodiazole), squaric acid and mixtures thereof.

In preferred embodiments, the metal ($M^{+y}$) of the metal precursor is at least one transition metal selected from the group consisting of Mg, V, Cr, Mo, Zr, Hf, Mn, Fe, Co, Cu, Ni, Zn, Ru, Al, and Ga. As used herein, "metal ion" is selected from the group consisting of elements of groups Ia, IIa, IIIa, IVa to VIIIa and IB to VIb of the periodic table of the elements. In certain other embodiments, the metal precursor may comprise clusters of metal oxides.

In a preferred embodiment, the metal organic framework is at least one selected from the group consisting of MIL-101, MIL-100, MIL-53, MOF-74, UiO-66, UiO-67, ZIF-8, ZIFs, HKUST-1, $M_2$(dobpdc), NU-1000, PCN-222, PCN-224, and derivatives thereof. As used herein, a metal organic framework may refer to compounds consisting of metal ions or clusters coordinated to organic ligands to form one-, two- or three-dimensional structures, with the special feature of porosity. More formally, a metal organic framework is a coordination network with organic ligands containing potential voids. In a preferred embodiment, the nano-crystalline MOF has a percent porosity of greater than 10%, preferably greater than 20%, preferably greater than 25%, preferably greater than 30%, preferably greater than 35%, preferably greater than 40%. MOFs are composed of two major components: a metal ion or cluster of metal ions and an organic molecule often termed a linker. The organic units are typically mono-, di-, tri-, or tetravalent ligands. The choice of metal and linker will dictate the structure and hence properties of the MOF. For example, the metal's coordination preference influences the size and shape of pores by dictating how many ligands can bind to the metal and in which orientation.

In a preferred embodiment, the hybrid material has a weight percentage of the metal organic framework in the range of 5-50% relative to the total weight of the hybrid material, preferably 15-45%, preferably 25-40%, preferably 30-35%, or at least 20%, preferably at least 25%, preferably at least 30%, preferably at least 35%, preferably at least 40%, preferably at least 45%.

In a preferred embodiment, the hybrid material comprises mesopores with an average diameter in the range of 2-50 nm, preferably 4-45 nm, preferably 6-40 nm and micropores with an average diameter in the range of 0.5-5.0 nm, preferably 1.0-4.5 nm, preferably 2.0-4.0 nm. In a preferred embodiment, the mesopores, the micropores, or both are monodisperse having a coefficient of variation of less than 10%, preferably less than 8%, preferably less than 6%, preferably less than 5%, preferably less than 4%, preferably less than 3%. In a preferred embodiment, the hybrid material has a percent porosity of greater than 10%, preferably greater than 20%, preferably greater than 25%, preferably greater than 30%, preferably greater than 35%, preferably greater than 40%. In a preferred embodiment, the hybrid material has a reduced mesoporosity relative to the bare mesoporous material and an increased microporosity relative to the bare mesoporous material.

In a preferred embodiment, the nano-crystalline metal organic framework has an average longest linear dimension of less than 40 nm, preferably less than 35 nm, preferably less than 30 nm, preferably less than 25 nm.

In a preferred embodiment, the hybrid material has a surface area in the range of 200-1200 $m^2/g$, preferably 300-1100 $m^2/g$, preferably 400-1000 $m^2/g$, preferably 500-950 $m^2/g$, preferably 600-900 $m^2/g$, preferably 700-850 $m^2/g$, or at least 400 $m^2/g$, preferably at least 600 $m^2/g$, preferably at least 800 $m^2/g$, preferably at least 1000 $m^2/g$. In a preferred embodiment, the hybrid material has a surface area in the range of 105-500% that of the surface area of the impregnated mesoporous salt material, preferably 150-450%, preferably 175-400%, preferably 200-350%, preferably 225-350% that of the surface area of the impregnated mesoporous salt material. In a preferred embodiment, the hybrid material has a surface area in the range of 125-500% that of the surface area of the bare mesoporous material, preferably 150-450%, preferably 175-400%, preferably 200-350%, preferably 225-350% that of the surface area of the bare mesoporous material.

In a preferred embodiment, the hybrid material has an average longest linear dimension of 100-500 μm, preferably 125-450 μm, preferably 150-400 μm, preferably 175-350 μm, preferably 200-300 μm.

In some embodiments, with the calculated average particle size and particle apparent density values, the fluidization regime of the hybrid material particles of the present disclosure can be determined using Geldart's powder classification chart. Geldart groups powders into four "Geldart Groups" or "Geldart Classes". The groups are defined by solid-fluid density difference and particle size. Design methods for fluidized beds can be tailored based upon a particle's Geldart Group. For Geldart Group A the particle size is between 20 and 100 μm and the particle density is typically less than 1.4 g/cm³. For Geldart Group B the particle size lies between 40 and 500 μm and the particle density is between 1.4-4 g/cm³. For Geldart Group C the group contains extremely fine and consequently the most cohesive particles with a particle size of 20 to 30 μm. The hybrid material particles of the present disclosure are preferably fluidizable and may be classified as a Geldart Group A powder, a Geldart Group B powder, a Geldart Group C powder or a Geldart Group D powder, preferably as a Geldart Group B powder or a Geldart Group A powder, preferably a Geldart Group B powder. In at least one preferred embodiment, the hybrid material particles display a Geldart Group B powder property, which is highly fluidizable.

According to a second aspect, the present disclosure relates to a hybrid material comprising i) a mesoporous material comprising mesopores and ii) a nano-crystalline metal organic framework comprising micropores, wherein the nano-crystalline metal organic framework is homogeneously dispersed and substantially present within the mesopores or void spaces of the mesoporous material, and wherein the hybrid material has a weight percentage of the metal organic framework in the range of 5-50% relative to the total weight of the hybrid material.

According to a third aspect, the present disclosure relates to a gas adsorbent comprising the hybrid material. According to a fourth aspect, the present disclosure relates to a method of adsorbing, separating, storing or sequestering at least one gas, comprising contacting the gas adsorbent with the at least one gas and wherein the at least one gas is selected from the group consisting of hydrogen ($H_2$), hydrogen sulfide ($H_2S$), sulfur dioxide ($SO_2$), methane ($CH_4$) and carbon dioxide ($CO_2$) [example of application 1]. According to a fifth aspect, the present disclosure relates to a catalyst comprising the hybrid material, preferably a heterogeneous catalyst that may be used in gas phase and liquid phase reactions. According to a sixth aspect, the present disclosure relates to a method of catalyzing a reaction, comprising reacting a substrate in the presence of the catalyst. Exemplary types of reactions include, but are not limited to, hydrogenation, methanol synthesis, oxidation, addition to carbonyls, epoxidation, transesterification, alcoholysis (methanolysis) of epoxides, cyanosilylation, C—C coupling, isomerization, cyclization, rearrangement, and the like [example of application 2]. According to a seventh aspect, the present disclosure relates to a reactor configuration comprising a hybrid material described above. Exemplary types of reactor method include, but are not limited to, packed-bed, fluidized-bed, batch-bed, and the like. According to an eighth aspect, the present disclosure relates to a device or material comprising a hybrid material described above wherein the device or material is at least one selected from the group consisting of a drug delivery carrier, biomedical imaging material, a proton conductive material, a sensor and an optoelectronic device. According to a ninth aspect, the present disclosure relates to a method for liquid/gas chromatography. Exemplary types of chromatographic method include, but are not limited to, high-performance liquid chromatography (HPLC), chiral chromatography, gas chromatography, and the like. According to a tenth aspect, the present disclosure relates to the use of a dispositive comprising a hybrid material described above for sensing, capture and catalytic degradation of harmful gases and vapors.

In another aspect, there is provided a method, comprising i) contacting an aqueous solution of an organic ligand salt of the formula $A_x(L^{-x})$ with a mesoporous material (MPM) to form an impregnated mesoporous salt material of the formula $A_x(L^{-x})$/MPM where A is a counter ion, x is a whole number, and L is an organic ligand, ii) treating the impregnated mesoporous salt material with an aqueous acidic solution to form an impregnated mesoporous acid material of the formula $H_x(L^{-x})$/MPM where H is hydrogen, iii) contacting an aqueous solution of a metal precursor of the formula $M^{+y}(B)_y$ with the impregnated mesoporous acid material to form an impregnated mesoporous metal organic framework precursor of the formula $[M^{+y}(B)_y][H_x(L^{-x})]$/MPM where M is a metal, y is a whole number, and B is an anion; and iv) at least one of 1) heating the impregnated mesoporous metal organic framework precursor in the presence of a catalytic amount of a solvent or 2) exposing the impregnated mesoporous metal organic framework precursor to a volatile vapor in the presence of a catalytic amount of a solvent such that the heating or the exposing forms a hybrid material of the formula $(M^{+y}L^{-x})$/MPM.

In this aspect, the hybrid material comprises a nano-crystalline metal organic framework (MOF) embedded within the mesoporous material, the nano-crystalline metal organic framework is homogeneously dispersed and substantially present only within the mesopores or void spaces of the mesoporous material; and the solvent is at least one selected from the group consisting of water, ethanol, methanol, tetrahydrofuran, and N,N-dimethylformamide and is present in a weight amount of less than 75% of the weight amount of the hybrid material formed.

The examples below are intended to further illustrate protocols for preparing and characterizing the metal organic framework and mesoporous material hybrid materials of the present disclosure. Further, they are intended to illustrate assessing the properties and applications of these metal organic framework and mesoporous material hybrid materials. They are not intended to limit the scope of the claims.

5.1. Definitions

While the following terms are believed to be well understood by one of ordinary skill in the art, the following definitions are set forth to facilitate explanation of the presently disclosed subject matter.

Throughout the present specification, the terms "about" and/or "approximately" may be used in conjunction with numerical values and/or ranges. The term "about" is understood to mean those values near to a recited value. For example, "about 40 [units]" may mean within ±25% of 40 (e.g., from 30 to 50), within ±20%, ±15%, ±10%, ±9%, ±8%, ±7%, ±6%, ±5%, ±4%, ±3%, ±2%, ±1%, less than ±1%, or any other value or range of values therein or there below. Furthermore, the phrases "less than about [a value]" or "greater than about [a value]" should be understood in view of the definition of the term "about" provided herein. The terms "about" and "approximately" may be used interchangeably.

Throughout the present specification, numerical ranges are provided for certain quantities. It is to be understood that these ranges comprise all subranges therein. Thus, the range "from 50 to 80" includes all possible ranges therein (e.g., 51-79, 52-78, 53-77, 54-76, 55-75, 60-70, etc.). Furthermore, all values within a given range may be an endpoint for the range encompassed thereby (e.g., the range 50-80 includes the ranges with endpoints such as 55-80, 50-75, etc.).

As used herein, the verb "comprise" as is used in this description and in the claims and its conjugations are used in its non-limiting sense to mean that items following the word are included, but items not specifically mentioned are not excluded.

Throughout the specification the word "comprising," or variations such as "comprises" or "comprising," will be understood to imply the inclusion of a stated element, integer or step, or group of elements, integers or steps, but not the exclusion of any other element, integer or step, or group of elements, integers or steps. The present disclosure may suitably "comprise", "consist of", or "consist essentially of", the steps, elements, and/or reagents described in the claims.

It is further noted that the claims may be drafted to exclude any optional element. As such, this statement is intended to serve as antecedent basis for use of such exclusive terminology as "solely", "only" and the like in connection with the recitation of claim elements, or the use of a "negative" limitation.

Unless defined otherwise, all technical and scientific terms used herein have the same meanings as commonly understood by one of ordinary skill in the art to which this disclosure belongs. Preferred methods, devices, and materials are described, although any methods and materials similar or equivalent to those described herein can be used in the practice or testing of the present disclosure. All references cited herein are incorporated by reference in their entirety.

The following Examples further illustrate the disclosure and are not intended to limit the scope. In particular, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

6. EXAMPLES 6.1. Materials and Methods

Chemicals. All chemicals were used as received from Sigma-Aldrich without further purification. $Cr(NO_3)_3 \cdot 9H_2O$, $CrCl_3 \cdot 6H_2O$, $Al(NO_3)_3 \cdot 9H_2O$, $AlCl_3 \cdot xH_2O$, $Co(NO_3)_2 \cdot 6H_2O$, $Ni(NO_3)_2 \cdot 6H_2O$, $ZrOCl_2 \cdot 8H_2O$, $RuCl_3 \cdot xH_2O$, $Zn(NO_3)_2 \cdot 9H_2O$, 1,4-benzenedicarboxylic acid ($H_2BDC$), 1,3,5-benzenetricarboxylic acid ($H_3BTC$), 2-aminoterephthalic acid ($H_2BDC(NH_2)$), monosodium 2-sulfoterephthalate ($H_2BDC(SO_3Na)$), 2,5-dihydroxyterephthalic acid ($H_4DOBDC$), 2,2'-Bipyridine-5,5'-dicarboxylic acid ($H_2BpyDC$), 2-methylimidazol (HMeIM), tetrakis(4-carboxy-phenyl)-porphyrin ($H_4TCPP$). 1,3,6,8-tetrakis(p-benzoic acid)pyrene ($H_4TBAPy$) was synthetized according to the published procedure. See Deria, P.; Bury, W.; Hupp, J. T.; Farha, O. K.: Versatile functionalization of the NU-1000 platform by solvent-assisted ligand incorporation. *Chem. Commun.* 2014, 50, 1965-1968. Triethylamine (TEA), N,N-dimethylformamide (DMF), tetrahydrofuran (THF) and methanol (MeOH) were of analytical grade (Sigma-Aldrich).

Mesoporous Materials.

Silica(A) [75-250 µm], Silica(B) [200-500 µm], Silica(C) [75-200 µm] and Silica(D) [75-150 µm] were kindly supplied by our commercial partner. SBA-15 was prepared according to the published procedure. Zhao, D. Y.; Feng, J. L.; Huo, Q. S.; Melosh, N.; Fredrickson, G. H.; Chmelka, B. F.; Stucky, G. D.: Triblock copolymer syntheses of mesoporous silica with periodic 50 to 300 angstrom pores. *Science* 1998, 279, 548-552. MCM-41 was provided by Claytec, γ-$Al_2O_3$ by Sasol, $TiO_2$ by Sachtleben and $ZrO_2$ by Mel Chemicals. Mesoporous carbon and HayeSep A (Supelco) [100-120 µm] were supplied by Sigma-Aldrich. All mesoporous materials were degassed at 120° C. overnight under vacuum to remove the adsorbed water.

Ligand Salt Precursors.

$Na_2BDC$ and $Na_3BTC$ ligand salt precursors were prepared from their acid form in water with the stoichiometric amount of NaOH necessary to deprotonate the carboxylic acid of the organic linker followed by a purification step via precipitation in acetone. Alternatively, ligand salt precursor solutions for $H_2BDC(NH_2)$, $H_2BpyDC$, $H_4TCPP$ and $H_4TBAPy$ were directly prepared with the stoichiometric amount of TEA, thereby skipping the step of isolating the ligand salt. H$_2$BDC(SO$_3$Na) and HMeIM were directly dissolved in water. H$_4$DOBDC was dissolved in hot THF due to the insolubility in water of sodium 2,5-dioxyterephthalate coordination polymers and the use of triethylammonium salts did not give rise the targeted MOF-74 structure.

Bulk-Type MOFs.

For comparison purposes, the following MOFs were prepared and activated according to the reported literature: (Cr)MIL-101 (Ferey, G.; Mellot-Draznieks, C.; Serre, C.; Millange, F.; Dutour, J.; Surble, S.; Margiolaki, I.: A chromium terephthalate-based solid with unusually large pore volumes and surface area. *Science* 2005, 309, 2040-2042 and Serre, C.; Millange, F.; Thouvenot, C.; Noguès, M.; Marsolier, G.; Louer, D.; Ferey, G.: Very Large Breathing Effect in the First Nanoporous Chromium(III)-Based Solids: MIL-53 or CrIII(OH).{O$_2$C—C$_6$H$_4$—CO$_2$} {HO$_2$C—C$_6$H$_4$—CO$_2$H}x.H$_2$Oy. *J. Am. Chem. Soc.* 2002, 124, 13519-13526), (Cr)MIL-100 (Long, P. P.; Wu, H. W.; Zhao, Q.; Wang, Y. X.; Dong, J. X.; Li, J. P.: Solvent effect on the synthesis of MIL-96(Cr) and MIL-100(Cr). *Microporous Mesoporous Mater.* 2011, 142, 489-493), (Cr)MIL-101 (SO$_3$H)(Juan-Alcaniz, J.; Gielisse, R.; Lago, A. B.; Ramos-Fernan-dez, E. V.; Serra-Crespo, P.; Devic, T.; Guillou, N.; Serre, C.; Kapteijn, F.; Gascon, J.: Towards acid MOFs—catalytic performance of sulfonic acid functionalized architectures. *Catal. Sci. Technol.* 2013, 3, 2311-2318), (Al)MIL-100 (Volkringer, C.; Popov, D.; Loiseau, T.; Férey, G.; Burghammer, M.; Riekel, C.; Haouas, M.; Taulelle, F.: Synthesis, Single-Crystal X-ray Microdiffraction, and NMR Characterizations of the Giant Pore Metal-Organic Framework Aluminum Trimesate MIL-100. *Chem. Mater.* 2009, 21, 5695-5697), (Al)MIL-53(NH2) (Couck, S.; Denayer, J. F. M.; Baron, G. V.; Remy, T.; Gas-con, J.; Kapteijn, F.: An Amine-Functionalized MIL-53 Metal-Organic Framework with Large Separation Power for CO$_2$ and CH$_4$. *J. Am. Chem. Soc.* 2009, 131, 6326-+), (Co, Ni)MOF-74 (Dietzel, P. D. C.; Morita, Y.; Blom, R.; Fjellvåg, H.: An In Situ High-Temperature Single-Crystal Investigation of a Dehydrated Metal-Organic Framework Compound and Field-Induced Magnetization of One-Dimensional Metal-Oxygen Chains. *Angew. Chem., Int. Ed.* 2005, 44, 6354-6358 and Dietzel, P. D. C.; Panella, B.; Hirscher, M.; Blom, R.; Fjell-vag, H.: Hydrogen adsorption in a nickel based coordination polymer with open metal sites in the cylindrical cavities of the desolvated frame-work. *Chem. Commun.* 2006, 959-961), (Zr)UiO-66(H,NH$_2$)(Kandiah, M.; Nilsen, M. H.; Usseglio, S.; Jakobsen, S.; Ols-bye, U.; Tilset, M.; Larabi, C.; Quadrelli, E. A.; Bonino, F.; Lillerud, K. P.: Synthesis and Stability of Tagged UiO-66 Zr-MOFs. *Chem. Ma-ter.* 2010, 22, 6632-6640), (Zr)UiO-67(Bpy)(Fei, H.; Cohen, S. M.: A robust, catalytic metal-organic framework with open 2,2-bipyridine sites. *Chem. Commun.* 2014, 50, 4810-4812), (Ru)HKUST-1 (Kozachuk, 0.; Luz, I.; Llabrés i Xamena, F. X.; Noei, H.; Kauer, M.; Albada, H. B.; Bloch, E. D.; Marler, B.; Wang, Y.; Muhler, M.; Fischer, R. A.: Multifunctional, Defect-Engineered Metal—Organic Frameworks with Ruthenium Centers: Sorption and Catalytic Proper-ties. *Angew. Chem., Int. Ed.* 2014, 53, 7058-7062), (Zn)ZIF-8 (Cravillon, J.; Münzer, S.; Lohmeier, S.-J.; Feldhoff, A.; Hu-ber, K.; Wiebcke, M.: Rapid Room-Temperature Synthesis and Characterization of Nanocrystals of a Prototypical Zeolitic Imidazolate Framework. *Chem. Mater.* 2009, 21, 1410-1412), (Zr)PCN-222 (Dawei Feng; Zhi-Yuan Gu; Jian-Rong Li; Hai-Long Jiang; Zhangwen-Wei; Zhou, H.-C.: Zirconium-Metalloporphyrin PCN-222: Mesoporous Metal-Organic Frameworks with Ultrahigh Stability as Biomimetic Catalysts. Angew. Chem., Int. Ed. 2012, 51, 10307-10310), (Zr)NU-1000 (Deria et al. 2014) and Co$_2$(dobpdc)(McDonald et al. Cooperative insertion of CO$_2$ in diamine-appended metal-organic frameworks. *Nature* 2015, 519, 303-+). FTIR spectra of these MOFs was used as reference for MOF/MPM hybrid materials. N$_2$ isotherms and pore distribution for (Cr)MIL-101(SO$_3$H) were included in Figures.

Solid State Synthesis of 19.1 wt. % (Cr)MIL-101(SO$_3$H) Precursor Solution on Mesoporous Silica(A).

100 mL of an aqueous solution containing 20 g H$_2$BDC (SO$_3$Na) was impregnated to 50 grams of evacuated mesoporous silica(A) and was dried at 50° C. under vacuum in a rotavapor for 2 h. Subsequently, the resulting dry material [H$_2$BDC(SO$_3$Na)/Silica(A)] was placed in a tubular calcination reactor where was first treated with a nitrogen flow saturated with concentrated HCl (37%) for 2 hours at room temperature and after purged with a nitrogen flow for 2 h to remove the excess of HCl. Afterwards, 75 mL of an aqueous solution containing 15 gr of Cr(NO$_3$)$_3$.9H$_2$O in 75 mL of H$_2$O was impregnated to the compound [H$_2$BDC(SO$_3$H)/Silica(A)]. The resulting solid [Cr(NO$_3$)$_3$/H$_2$BDC(SO$_3$H)/Silica(A)] was finally dried at 50° C. under high vacuum in a rotavapor for 2 h. All the impregnation steps were done via incipient wetness impregnation. The solid [Cr(NO$_3$)$_3$/H$_2$BDC(SO$_3$H)/Silica(A)] was separated in two 125 mL stainless steel Parr autoclave (>40% void space) at 190° C. for 24 h after adjusting the water contain of the solid to 15-20 wt. %. After cooling the autoclave, the resulting products were thoroughly washed with distillated water in a filtration funnel. Subsequently, the material was washed overnight in a Soxhlet with MeOH. All the materials were activated overnight at 120° C. under vacuum.

Focused Ion Beam-Scanning Electron Microscopy (FIB-SEM).

Figure 8:
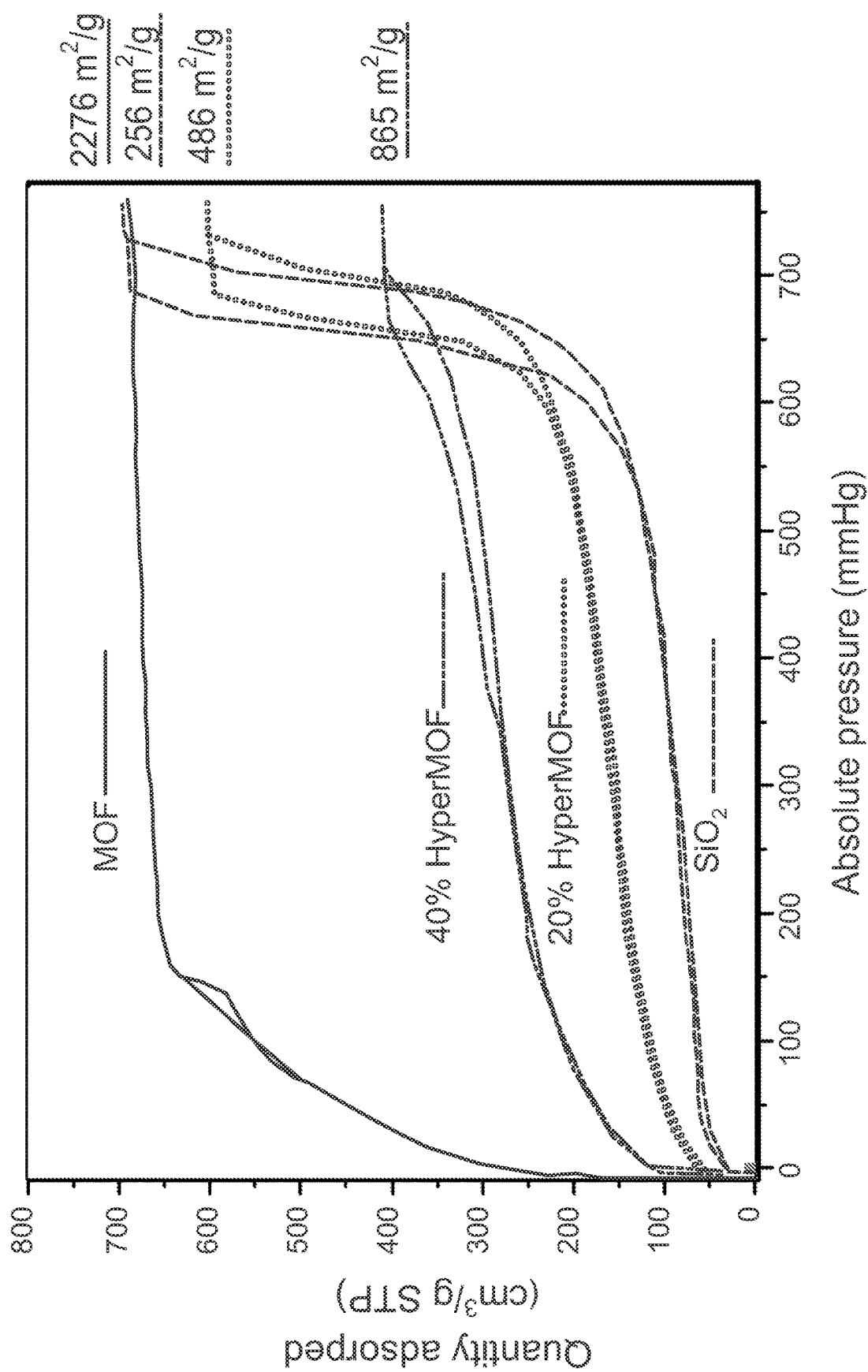
FIG. 8 are the type IV $N_2$ isotherms of two hybrid materials HyperMOF with different MOF loadings (20% and 40%), bulk MOF, and bare $SiO_2$.

FIB-SEM sample preparation was performed in a Dual-Beam FEI Quanta 3D FEG microscope which combines a high-resolution Field Emission Gun SEM column with a high current Ga liquid metal ion gun FIB column. The results are illustrated in FIG. 8.

Transmission Electron Microscopy (TEM).

Transmission electron microscopy (TEM) experiments were performed in a JEOL JEM-2000FX S/TEM microscope with LaB6 emitter at 200 kV with a 120 μm condenser lens aperture and 80 μm objective lens aperture inserted.

N$_2$ Sorption Isotherms.

The samples were analyzed in a Micromeritics ASAP (Accelerated Surface Area and Porosimetry) 2020 System. Samples were weighted into tubes with seal frits and degassed under vacuum (<500 μm Hg) with heating. They were initially heated at 150° C. and held for 4 hours, and finally cooled to room temperature and backfilled with N$_2$. The samples were re-weighted before analysis. The analysis adsorptive was N$_2$ at 77K. A multi-point BET surface area was determined from 6 measurements at relative pressures (P/Po) ranging from 0.050 to 0.300 satisfying the four criteria suggested by Rouquerol. See Gomez-Gualdron, D. A., Moghadam, P. Z., Hupp, J. T., Farha, O. K., Snurr, R. Q.: Application of Consistency Criteria To Calculate BET Areas of Micro- And Mesoporous Metal-Organic Frame-works. *J. Am. Chem. Soc.*, 2016, 138, 215-224. Single point adsorption total pore volume was measured near saturation pressure (Po≈770 mmHg). Adsorption average pore width was also calculated. Pore size distribution plot was determined by BJH method with Halsey thickness curve equation and Faas BJH correction.

X-Ray Fluorescence.

XRF analysis were performed in a ARL Thermo Scientific (Ecublens, Switzerland) Perform'X Wave-length-Dispersive X-ray Fluorescence (WDXRF) equipped with an X-ray tube 5GN-type Rh target with ultra-thin 30 μm Be window to maximize light element response. 4000 W power supply for 60 kV max or 120 mA max with two detectors (flow proportional and scintillation) and seven analyzer crystals to achieve a broad elemental range.

X-Ray Diffraction.

XRD was used to study the crystalline structure of the MOF/MPM hybrid materials. XRD patterns were recorded using a Panalytical Empyrean X-ray diffractom-eter with Cu Kα radiation (λ=1.54778 Å). The samples were prepared by filling the holder with the dry powder. Phase formation and phase transition behaviors of the UiO-66($NH_2$) powder were investigated using an XRK900 high temperature oven chamber. Sample was first heated in the chamber from 25° C. to 120° C. with a heating rate of 3° C./min and held at 120° C. for 12 hours. After that, sample was cooled to room temperature with a cooling rate of 10° C./min. Diffraction patterns were measured throughout the whole heat treatment using Cu Kα x-ray radiation with a wavelength of 1.5418 Å and a 2θ range of 4.5°-12°. Each pattern was measured for 4 minutes using a step size and count time of 2θ=0.0263° and 147 sec/step, respectively.

FTIR: ATR and DRIFTS Cell.

ATR absorption spectroscopy measurements were performed in the range of 4000-400 cm-1 with a Perkin Elmer Spectrum 100 FTIR spectrometer. The 'in situ' DRIFTS experiments were carried out in a Praying Mantis cell by injecting a nitrogen flow saturated with water for assisting the vapor-phase crystallization at 120° C.

Particle Attrition Measurements Using a Jet Cup.

Jet cup attrition testing is a common method for evaluating particle attrition in bubbled fluidized beds and circulating fluidized beds. Davidson attrition index for (Cr)MIL-101($SO_3H$)/Silica(A), (Cr)MIL-101($SO_3H$) and Silica(A) has been determined by following the standard procedure. See Cocco, R.; Arrington, Y.; Hays, R.; Findlay, J.; Karri, S. B. R.; Knowlton, T. M.: Jet cup attrition testing. *Powder Technol.* 2010, 200, 224-233.

Example 1

Figure 1:
FIG. 1 is an exemplary schematic representation of the general 'solid-state' crystallization of metal organic frameworks (MOFs) on mesoporous materials (MPMs) via multistep impregnation/evacuation to form hybrid materials (MOF/MPM), $A_x(L^{-x})$ is the salt of the MOF ligand and $M^{+y}(B)_y$ is the metal precursor.

Synthesis of Metal Organic Framework (MOF) and Mesoporous Material (MPM) Hybrid Materials (MOF/MPM) Via a Solid-State Crystallization Method In the procedure of the present disclosure, the impregnation of the metal organic framework (MOF) precursors on the mesoporous materials (MPMs) is performed in three steps due to the immediate precipitation of an amorphous phase after mixing the metal and the ligand salts in $H_2O$ (i.e. the formation of non-porous coordination polymers). This non-porous phase does not lead to the targeted crystalline MOF phase upon applying the specific synthesis conditions for each MOF formation. Therefore, after evacuation of the MPM, both precursors were incorporated within the MPM independently by including an intermediate step for the acidification of the organic ligand salt to the acid form. Each step is followed by a heating treatment at 120° C. in order to evacuate the water from the previous impregnation step. Then, the resulting dry solid was exposed to specific synthesis conditions in accordance with the specific MOF, metal and ligand involved. Finally, the product was washed by an environmental-friendly washing treatment using mainly distillated water followed by recycling methanol in a Soxhlet system. FIG. 1 presents an exemplary schematic representation of the general procedure to prepare metal organic framework (MOF) and mesoporous material (MPM) hybrid materials (MOF/MPM).

In an exemplary typical multistep impregnation procedure, 10 mL of an aqueous solution containing 'a' grams of a sodium ligand salt [$Na_x(L^{-x})$] was impregnated on 'b' grams of evacuated MPM and was dried at 120° C. under vacuum for 2 hours. Subsequently, the resulting dry material [$Na_x(L^{-x})$/MPM] was impregnated with 10 mL of 4M HCl and was dried at 120° C. under vacuum for 2 hours. Afterwards, 10 mL of an aqueous solution containing 'c' grams of $M_y(B^{-y})$ was added to the compound [$H_x(L^{-x})$/MPM] and dried again at 120° C. under vacuum for 2 hours. The amounts 'a', 'b', and 'c' are specific for each MOF/MPM hybrid combination.

Example 2

Screening of Metal Organic Frameworks (MOFs) and Mesoporous Materials (MPMs)

The first screening of metal organic frameworks (MOFs) was carried out using Silica (A) mesoporous silica. The resulting materials were named as HyperMOF-X. Table 1 presents the surface area and MOF loading and compositions of the MOF/MPM hybrid materials prepared on Silica (A) (HyperMOF-X). From this study, specific synthesis conditions were found as optimal to promote the MOF crystallization for each metal/ligand combination. For instance, (Cr) MIL-101 analogues were obtained at different temperatures and time of synthesis depending on the ligand used. (See A1, A2, and A3 entries in Table 1). On the other hand, some of the MOFs require the gas-phase infiltration of a volatile amine (i.e. methylaminetriethylamine) to gradually promote the MOF crystallization instead of heat, such as (M) MOF-74 and ZIF-8. This amine gas-phase infiltration approach at room temperature was particularly developed to overcome the limitations found in some specific cases and in order to achieve the MOF crystallization in the absence of solvent within the MPM pores. In this manner, amine vapors promote the slow ligand deprotonation required for the MOF crystallization instead of using solvents which usually have a role of boosting the deprotonation process due to their polarity (i.e. water, methanol, or ethanol) or the gradual release of amines due to the thermal decomposition of N,N'-dimethylformamide (DMF) at high temperatures.

TABLE 1

Synthesis conditions and compositions of the MOF-MPM hybrid materials prepared on Silica A (HyperMOF-X)

| code (X)[a] | MOF | metal | ligand | Synthesis conditions | Additive (wt. %)[b] | MOF (wt. %)[c] | $S_{BET}$ ($m^2/g$) |
|---|---|---|---|---|---|---|---|
| A1a | MIL-101 | Cr | BDC | 220° C., 1 h | 15% $H_2O$ | 30.8 | 584 |
| A2a | MIL-101 | Cr | BDC($SO_3H$) | 190° C., 1 d | 15% $H_2O$ | 19.1 | 486 |
| B1a | MIL-100 | Cr | BTC | 200° C., 2 h | 15% $H_2O$ | 35.0 | 647 |

TABLE 1-continued

Synthesis conditions and compositions of the MOF-MPM hybrid materials prepared on Silica A (HyperMOF-X)

| code (X)[a] | MOF | metal | ligand | Synthesis conditions | Additive (wt. %)[b] | MOF (wt. %)[c] | $S_{BET}$ (m²/g) |
|---|---|---|---|---|---|---|---|
| B2a | MIL-100 | Al | BTC | 200° C., 8 h | 15% $H_2O$ | 20.4 | 364 |
| C1a | MIL-53 | Cr | BDC | 220° C., 1 d | 15% $H_2O$ | 22.7 | 377 |
| C2a | MIL-53 | Al | BDC($NH_2$) | 120° C., 12 h | 15% DMF | 28.7 | 417 |
| D1a | MOF-74 | Co | DOBDC | RT, 1 h | $Et_3N$ vap. | 27.3 | 323 |
| D2a | MOF-74 | Ni | DOBDC | RT, 1 h | $Et_3N$ vap. | 27.7 | 386 |
| E1a | UiO-66 | Zr | BDC | 120° C., 2 h | 15% $H_2O$ | 30.0 | 363 |
| E2a | UiO-66 | Zr | BDC($NH_2$) | 120° C., 2 h | 15% $H_2O$ | 37.6 | 434 |
| F1a | UiO-67 | Zr | BpyDC | 120° C., 2 h | 15% $H_2O$ | 22.6 | 366 |
| G1a | ZIF-8 | Zn | MeIM | RT, 1 h | $Et_3N$ vap. | 22.6 | 346 |
| H1a | HKUST-1 | Ru | BTC | 160° C., 1 d | 15% $H_2O$ | 11.0 | 258 |
| I1a | PCN-222 | Zr | TCPP | 120° C., 12 h | 15% DMF | 9.8 | 348 |
| J1a | NU-1000 | Zr | TBAPy | 120° C., 12 h | 15% DMF | 12.8 | 364 |
| K1a | $Co_2$(DOBPDC) | Co | DOBPDC | RT, 1 h | $Et_3N$ vap. | 13.4 | 344 |

Silica(A) ($S_{BET}$ = 256 m²/g); precursors loaded on Silica(A) ($S_{BET}$ = 100 ± 50 m²/g);
[a]code corresponding to the material data sheet (MDS) in SI;
[b]per weight of resulting MOF precursors loaded on silica;
[c]determined by XRF.

TABLE 2

Versatility and scope of the solid-state crystallization of (Cr)MIL-101($SO_3H$) within different mesoporous supports.

| | | MPM | | | | MOF/MPM | | |
|---|---|---|---|---|---|---|---|---|
| $z^a$ | mesoporous material | $\varphi_{width}$ (nm)[b] | $\varphi_{volume}$ (cm³/g) | SBET (m²/g) | [precursor] (mL/g MPM)[c] | $S_{BET}$ (m²/g) | $\varphi_{volume}$ (cm³/g) | MOF/MPM (wt. %)[d] |
| a | Silica(A) | 28 | 1.073 | 256 | 2 | 486 | 0.815 | 19.1 |
| b | Silica(B) | 33 | 1.164 | 252 | 2 | 577 | 0.896 | 21.9 |
| c | Silica(C) | 46 | 0.271 | 70 | 1.8 | 320 | 0.312 | 17.7 |
| d | Silica(D) | 42 | 0.215 | 82 | 1.8 | 373 | 0.332 | 14.3 |
| e | SBA-15 | 9.5 | 0.965 | 897 | 3.5 | 786 | 0.989 | 21.9 |
| f | MCM-41[e] | 2.5 | 0.951 | 1,033 | 5 | 172 | 0.471 | 16.1 |
| g | Carbon | 38 | 0.504 | 156 | 1.5 | 406 | 0.530 | 13.3 |
| h | $\gamma$-$Al_2O_3$ | 22 | 0.448 | 143 | 1.5 | 168 | 0.253 | 16.3 |
| i | $TiO_2^e$ | 4 | 0.246 | 308 | 1.2 | 278 | 0.240 | 13.0 |
| j | $ZrO_2^e$ | 2.6 | 0.224 | 320 | 1.2 | 142 | 0.194 | 14.4 |
| k | HayeSep A | 25 | 1.064 | 557 | 1.5 | 364 | 0.635 | 12.2 |

[a]Code MDS-A2z.
[b]Median pore width calculated by Horvath-Kawazoe.
[c]Volume of precursor solution added via IWI (volume added for 3rd IWI of the metal salt precursor solution is 75% lower due to the lower void volume remaining after previous IWIs).
[d]Calculated from the molecular formula of the evacuated MOF from metal contain measured by XRF. (Cr)MIL-101($SO_3H$) ($S_{BET}$ = 2,276 m²/g and $\Phi_{volume}$ = 1.066 cm³/g). Data is determined from $N_2$ sorption isotherms.
[e]These MPMs exhibit cavities smaller than the MOF cages and therefore leading to the formation of isomeric coordination polymers having poor microporosity instead of (Cr)MIL-101($SO_3H$).

According to the results obtained from these hybrid MOF/MPMs the method of the present disclosure may also be extended to prepare additional hybrid materials containing any MOFs composed by an organic ligand including, but not limited to, polycarboxylate ligands (such as for example terephthalate, benzene 1,3,5-tricarboxylate, 2,5-dioxibenzene dicarboxylate, and derivatives), azaheterocyclic ligands (such as for example imidazolate, pyrimidine-azolate, triazolate, tetrazolate, and derivatives), and combinations thereof, and metal oxide clusters or single metal atoms containing transition metals, such as for example the group including, but not limited to, Cr, Zr, Mn, Fe, Co, Cu, Ni, Zn, Ru, Al, and the like.

In order to study the scope of the method of the present disclosure a selected MOF was prepared on different mesoporous materials (MPMs), such as for example mesoporous silica (Silica (A, B, C and D)), mesoporous alumina ($\gamma$-$Al_2O_3$), porous carbon, and mesoporous polymers (Table 2). According to the results obtained from this screening, the method of the present disclosure can also be extended to other mesoporous materials having pores ranging from 5 to 50 nm composed by metal oxides, metals, carbon, hybrid organosilicas, and the like.

Example 3

Characterization of the Prepared Metal Organic Framework (MOF) and Mesoporous Material (MPM) Hybrid Materials (MOF/MPM)

The metal organic framework (MOF) and mesoporous material (MPM) hybrid materials (MOF/MPM) prepared were characterized by X-ray diffraction (XRD) and Fourier transformed infrared (FTIR) to confirm the presence and crystallinity of the MOF on the MPM. The homogeneity of the hybrid materials was evaluated by a combination of microscopic techniques, such as Z-polarized confocal microscopy, scanning electron microscopy (SEM) and transmission electron microscopy (TEM). The load of MOF contained on the resulting hybrids was calculated from the presence of metal measured by X-ray fluorescence (XRF), and the organic content was determined by thermogravimetric analysis (TGA). Nitrogen ($N_2$) isotherms of the hybrid materials were evaluated to calculate the surface area and pore size distribution as well as that of the MPM and the bulk MOF for comparison. Mechanical strength was determined using Jet Cup attrition index. The data from only one hybrid material is presented in the present disclosure, although similar data and results have been obtained and optimized for the other MOFs, MPMS, and hybrid materials.

Figure 2:
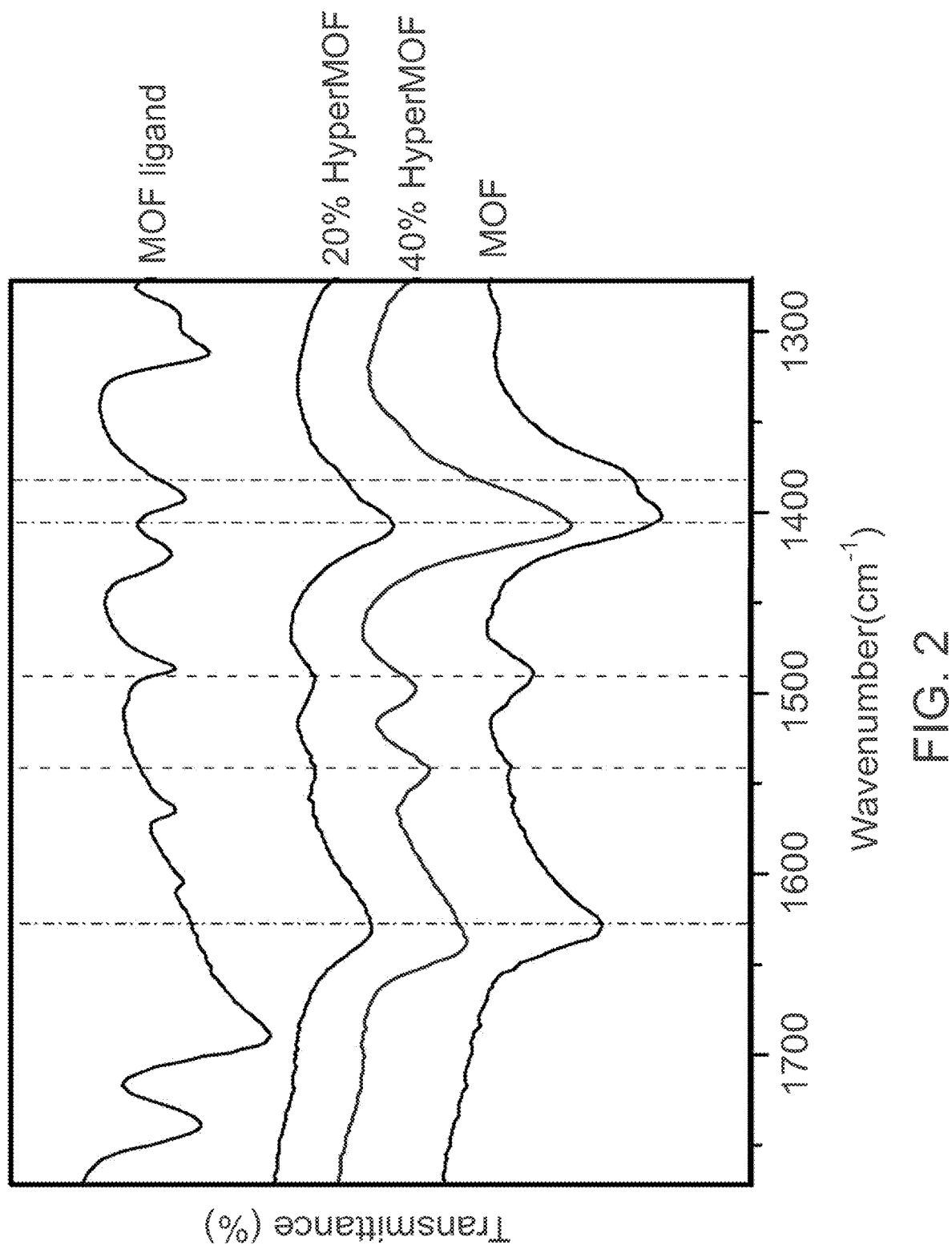
FIG. 2 is the Fourier transform infrared (FT-IR) spectra of two hybrid materials HyperMOF with different MOF loadings (20% and 40%), bulk MOF, the MOF ligand on $SiO_2$ and both MOF precursors on $SiO_2$ as salt.

FIG. 2 presents the FTIR spectra of two hybrid materials HyperMOF with different MOF loadings (20% and 40%), as well as the spectra of bulk MOF (the intensity was divided by three for better comparison to the hybrid materials), the MOF ligand on $SiO_2$ and both MOF precursors on $SiO_2$ as salt. The formation of different loadings of the MOF on $SiO_2$ are confirmed by the presence and intensity of the typical absorption bands corresponding to bulk MOF such as 1400 $cm^{-1}$ attributed to symmetric (O—C—O) vibrations as well as 1500 $cm^{-1}$ and 1640 $cm^{-1}$ attributed to benzene vibrations. In contrast, the conversion of the MOF precursors into the actual MOF can be demonstrated by the disappearance of the vibrational bands at 1700 $cm^{-1}$ and 1750 $cm^{-1}$ corresponding to the MOF precursors within the $SiO_2$ pores after heating the mixture at 190° C. for 24 hours.

Figure 3:
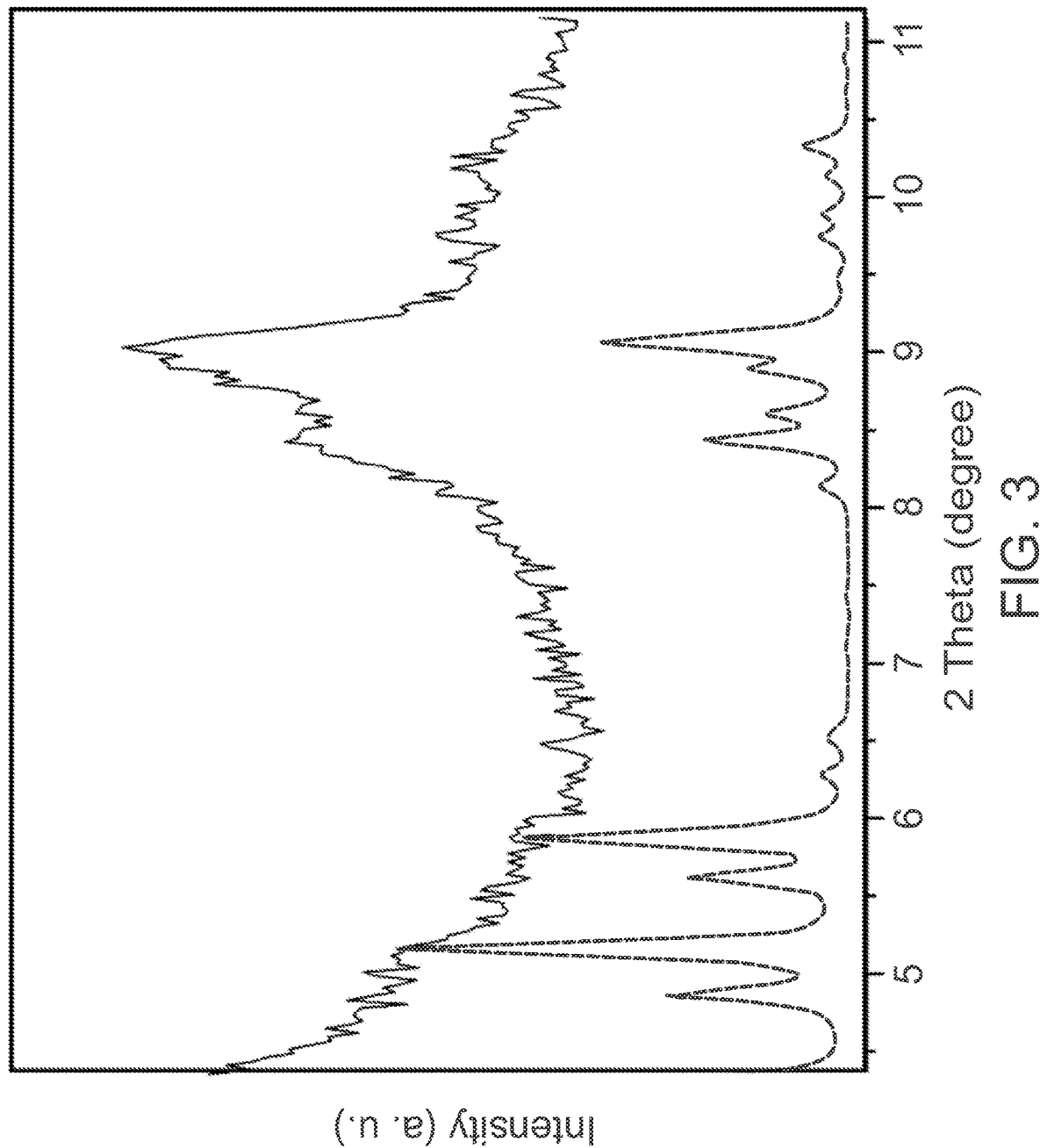
FIG. 3 is the X-ray diffraction (XRD) spectra of the hybrid material HyperMOF with a MOF loading of 20% (dotted lower line) and bulk MOF (solid upper line).

FIG. 3 presents the XRD spectra of the hybrid material HyperMOF with a MOF loading of 20% (up) and the simulated pattern of bulk MOF (down). The low intensity and broad peaks found in the XRD pattern of 20% HyperMOF can typically be attributed to the low concentration of crystalline MOF on the amorphous $SiO_2$ matrix (20%) and to the small size of the MOF crystallites, on the order of nanometers (less than 30 nm), respectively.

Figure 4A:
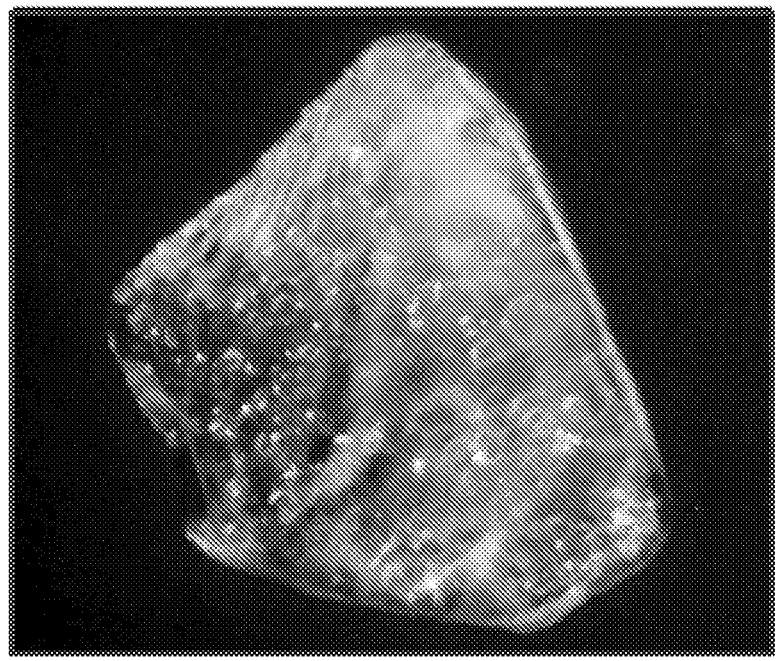
FIG. 4A is a Z-polarized confocal microscope image of bare $SiO_2$.
Figure 4B:
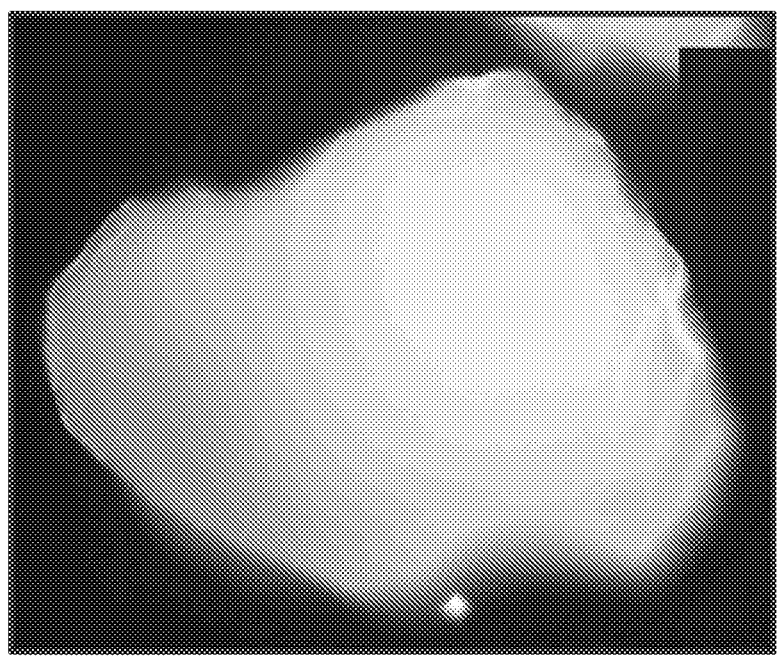
FIG. 4B is a Z-polarized confocal microscope image of the 20% HyperMOF hybrid material.
Figure 4C:
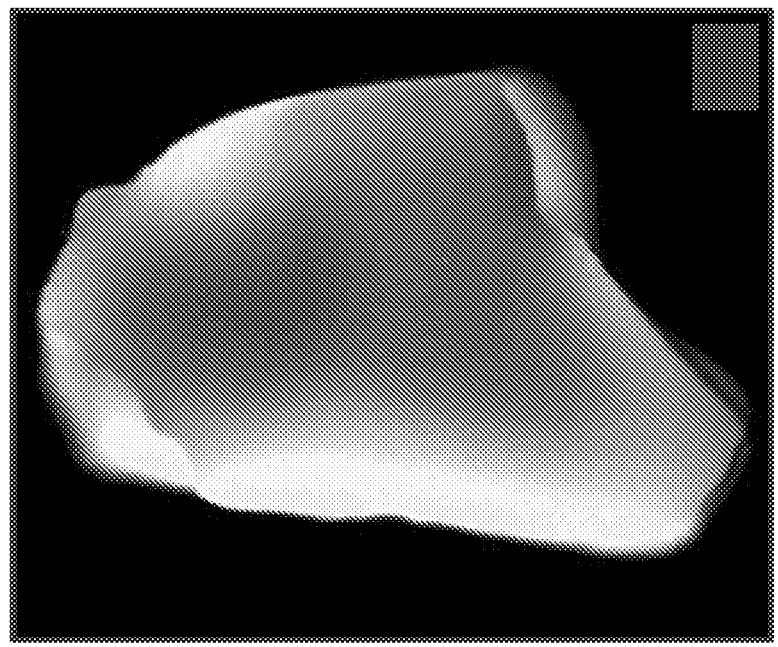
FIG. 4C is a Z-polarized confocal microscope image of the 40% HyperMOF hybrid material.

FIG. 4A is a Z-polarized confocal microscope image of bare $SiO_2$. FIG. 4B is the Z-polarized confocal microscope image of the 20% HyperMOF hybrid material. FIG. 4C is the Z-polarized confocal microscope image of the 40% hybrid material. Transparent amorphous $SiO_2$ is homogeneously filled with the crystalline MOF at different loadings as distinguished by the polarized light transmitted through an optically anisotropic sample (FIG. 4B and FIG. 4C) compared to the isotropic bare $SiO_2$ (FIG. 4A).

Figure 5A:
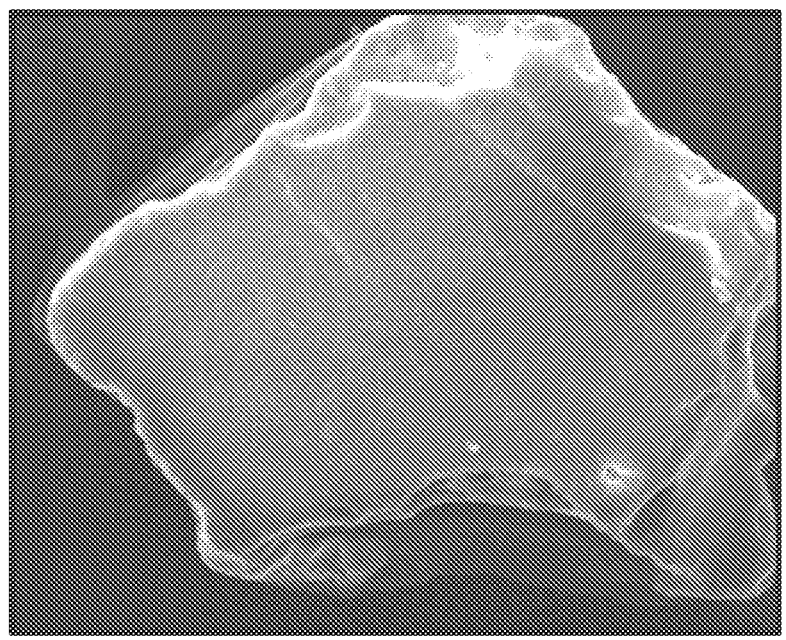
FIG. 5A is a scanning electron microscopy (SEM) image of the 20% HyperMOF hybrid material at 100 μm scale.
Figure 5B:
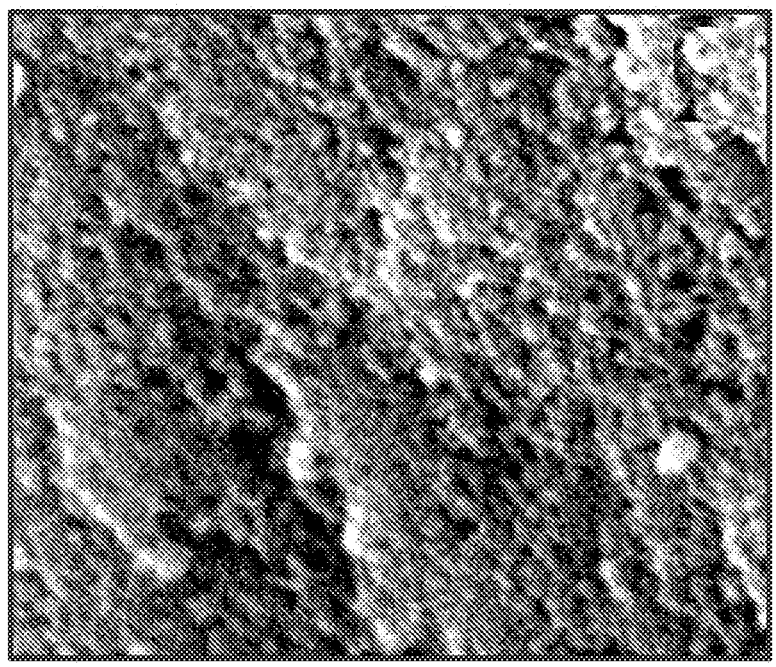
FIG. 5B is a SEM image of the 20% HyperMOF hybrid material at 1 μm scale.
Figure 5C:
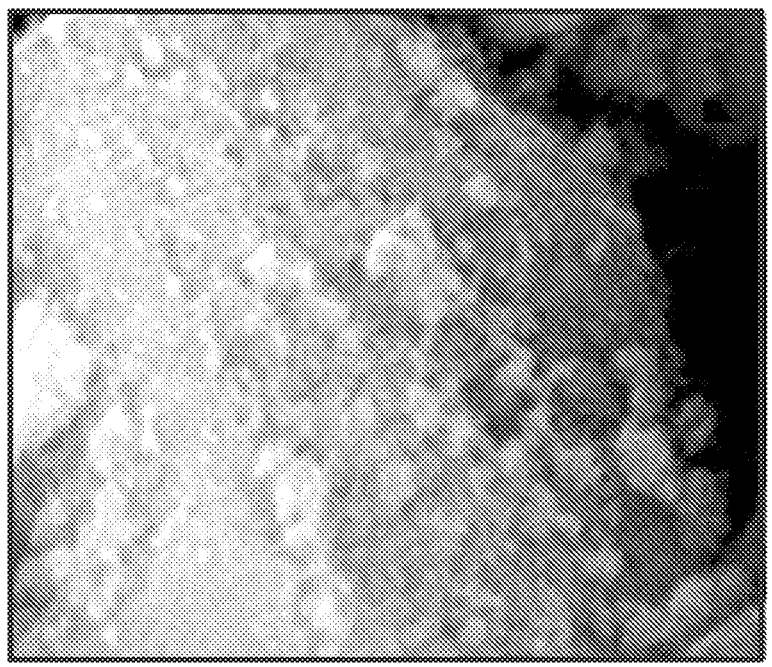
FIG. 5C is a SEM image of the 20% HyperMOF hybrid material at 1 μm scale after grinding the particles.

FIG. 5A shows the SEM image for the 20% HyperMOF hybrid material at 100 μm scale. FIG. 5B shows the SEM image for the 20% HyperMOF hybrid material at 1 μm scale. FIG. 5C shows the SEM image for the 20% hybrid material at 1 μm scale after grinding the particles. The SEM microscopy analysis confirmed the absence of large crystals or aggregates on the outer surface compared to a typical solvothermal synthesis. MOF nanocrystals were not able to be detected for the 20% HyperMOF hybrid material (FIG. 5A and FIG. 5B), even after grinding the particles (FIG. 5C), due to the small size (in the range of nanometers) of the MOF and the lack of contrast between the MOF and $SiO_2$ phases. The energy-dispersive X-ray spectroscopy (EDS) measured on these particles showed Cr metal contents below 1% which confirms that Cr is embedded within the $SiO_2$ pores, since the sampling depth of the instrument is 1-2 microns.

Figure 6A:
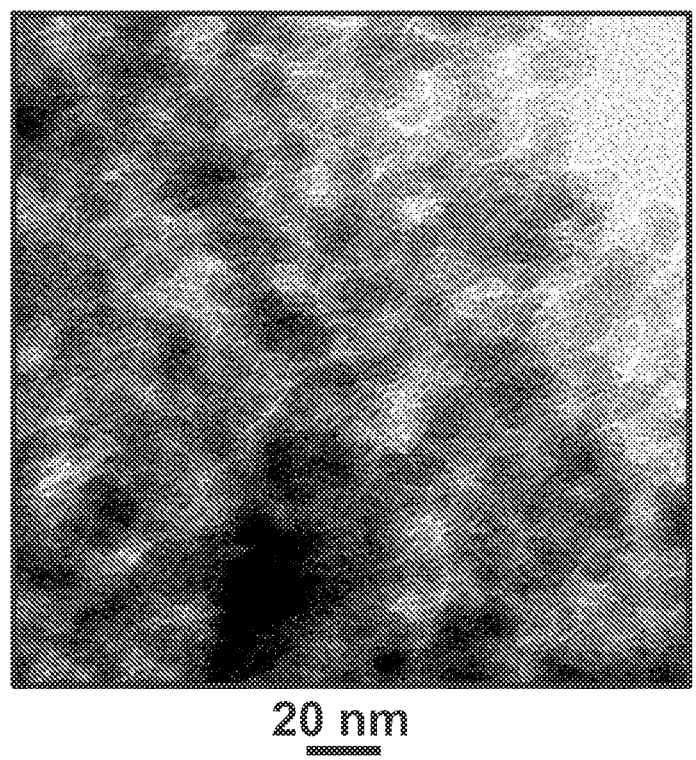
FIG. 6A is a transmission electron microscopy (TEM) image of bare $SiO_2$.
Figure 6B:
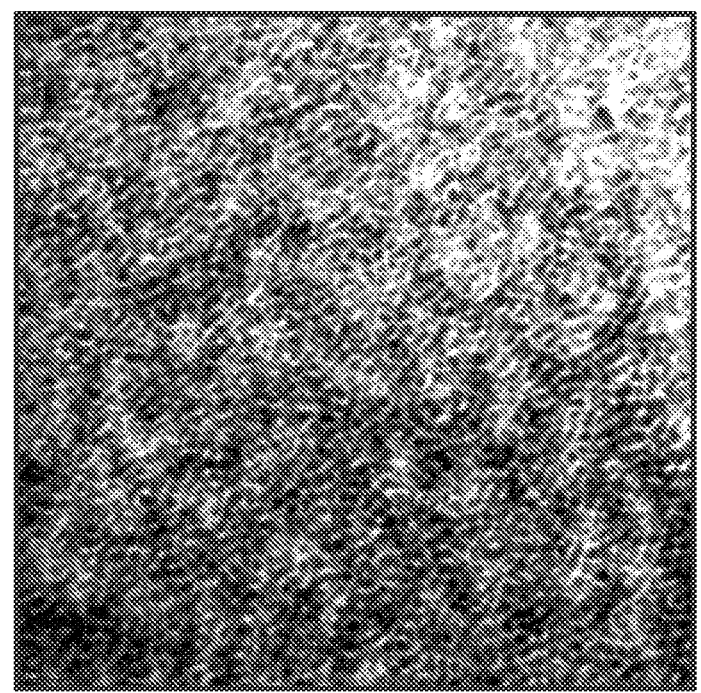
FIG. 6B is a TEM image of the 20% HyperMOF hybrid material.
Figure 6C:
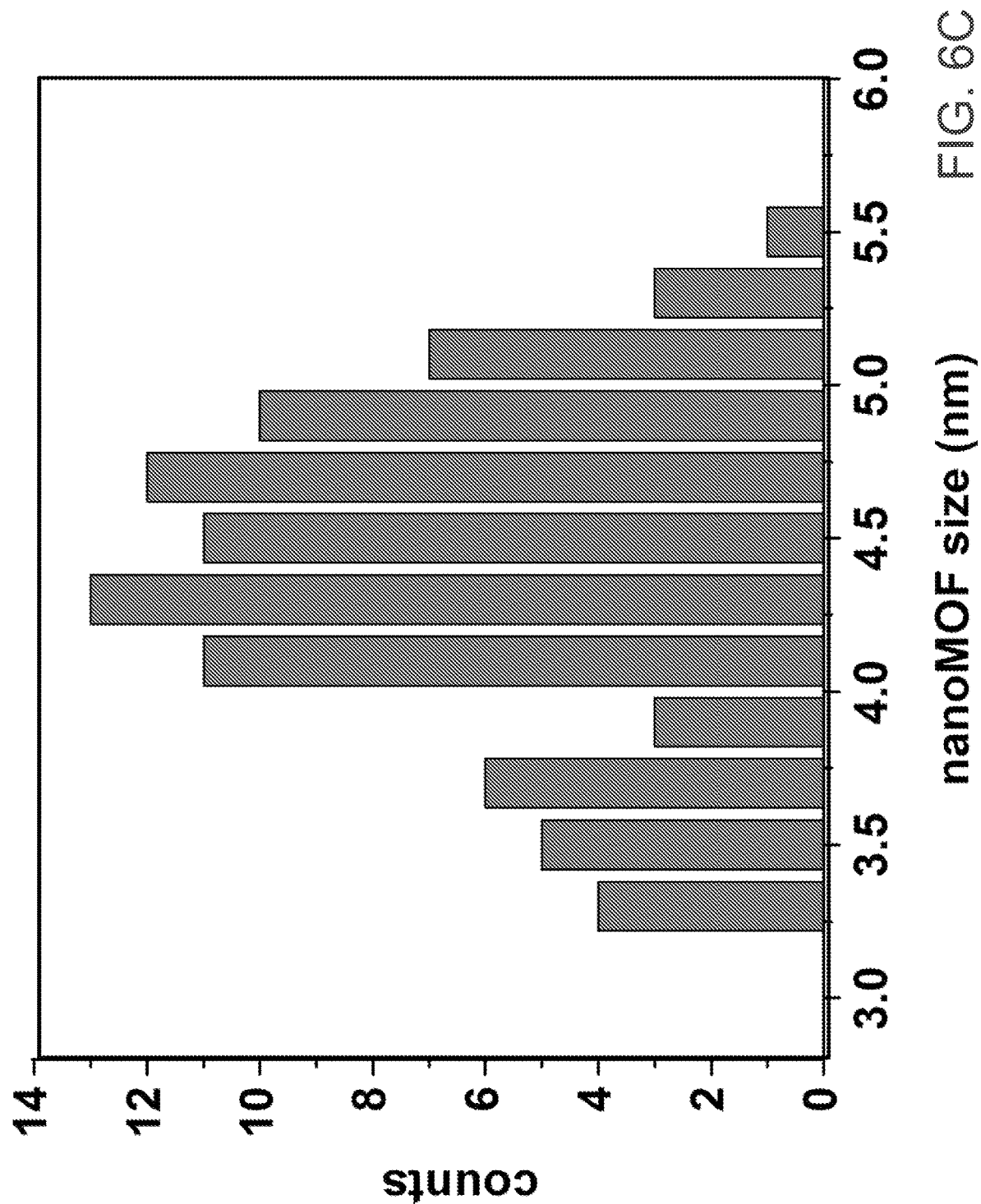
FIG. 6C is a histogram showing the MOF particle distribution.
Figure 7:
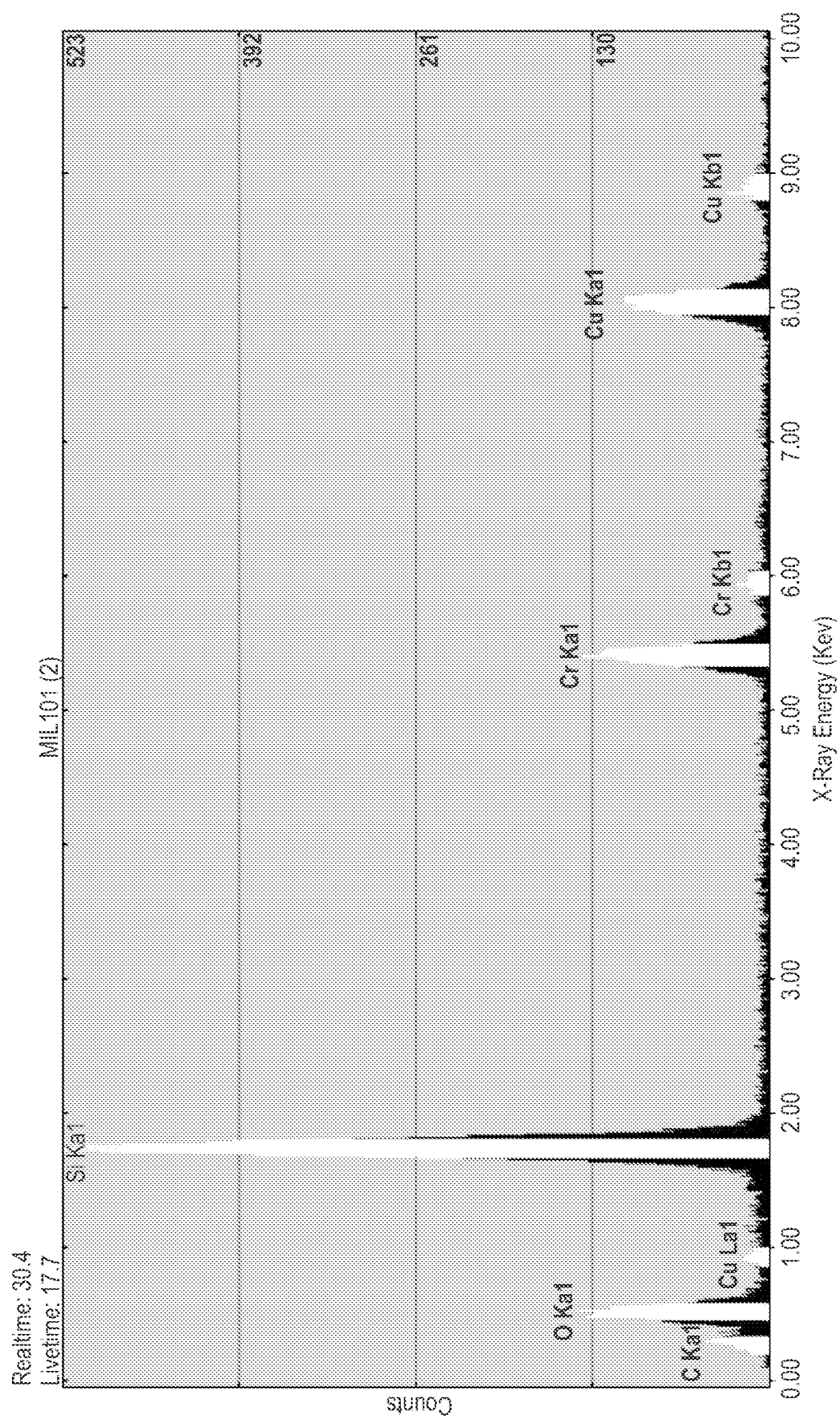
FIG. 7 is the energy-dispersive X-ray spectroscopy (EDS) spectrum of the 20% HyperMOF hybrid material.

FIG. 6A shows the TEM image of bare $SiO_2$. FIG. 6B shows the TEM image for the 20% HyperMOF hybrid material. The 20% HyperMOF hybrid material (FIG. 6B) samples reveal the presence of MOF nanocrystals of 4.5±1 nm in size (FIG. 6C) compared to a bare $SiO_2$ image (FIG. 6A) which reinforced the hypothesis of having MOF nanoparticles homogeneously dispersed within the $SiO_2$ mesopores. Moreover, although the sampling depth is also 1-2 microns, the EDS analysis of the small 20% HyperMOF hybrid material fragment showed a notable amount of Cr (~1 Cr: 5 $SiO_2$ of the peaks intensity). FIG. 7 is the EDS pattern of the 20% HyperMOF hybrid material.

Figure 9:
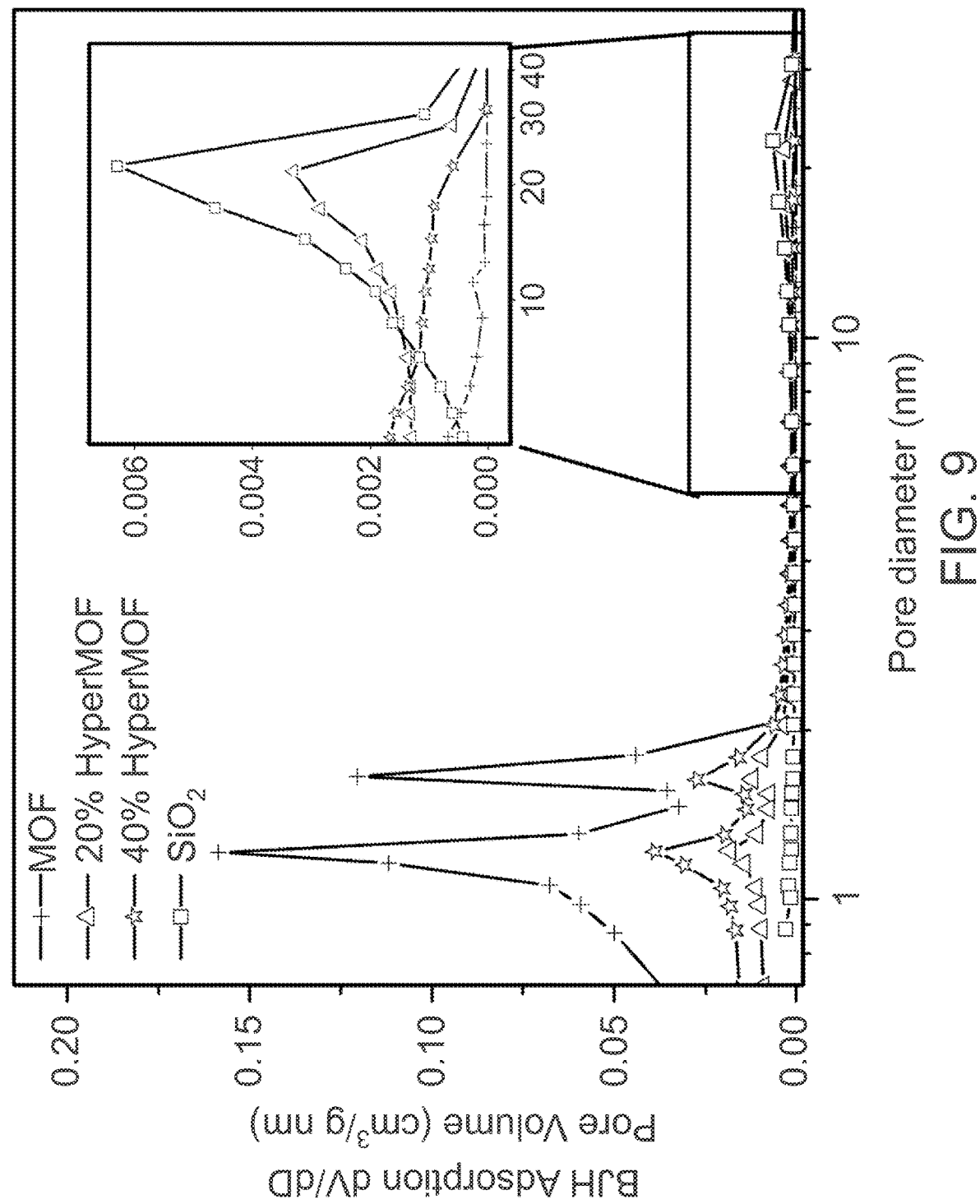
FIG. 9 is the Barrett-Joyner-Halenda (BJH) adsorption dV/dD pore volume plots of two hybrid materials HyperMOF with different MOF loadings (20% and 40%) and bare $SiO_2$.

FIG. 8 presents the type IV $N_2$ isotherms of two hybrid materials HyperMOF with different MOF loadings (20% and 40%), as well as the isotherm of bulk MOF and bare $SiO_2$. Type IV isotherms were measured for HyperMOF hybrid materials at different MOF loadings, which confirmed the capability of the method of the present disclosure for loading the $SiO_2$ mesoporosity with variable amounts of microporous MOF. The surface areas of 486 $m^2/g$ and 865 $m^2/g$ were determined for 20% and 40% MOF loaded $SiO_2$, respectively which are notably higher than the 256 $m^2/g$ measured for bare $SiO_2$. According to the mesoporous region of the isotherm above the point of inflexion (ranging from 350 to 760 mm Hg) the quantity of $N_2$ adsorbed by multilayer formation corresponding to complete filling by capillarity is declining as a function of the MOF loading compared to the bare $SiO_2$, thus confirming the occupancy of the pores of $SiO_2$ by the microporous MOF nanocrystals. This is sustained by the decreasing of the mesopore observed in the BJH Adsorption dV/dD Pore volume plot. FIG. 9 shows the BJH adsorption dV/dD pore volume plot. Moreover, the surface area measured for the 40% HyperMOF hybrid material can correspond to a 38% dissolution of bulk MOF (2.276 $m^2/g$) on a non-porous support without considering the surface area attributed to the remaining porosity of $SiO_2$ (likely below 50 $m^2/g$).

Figure 10:
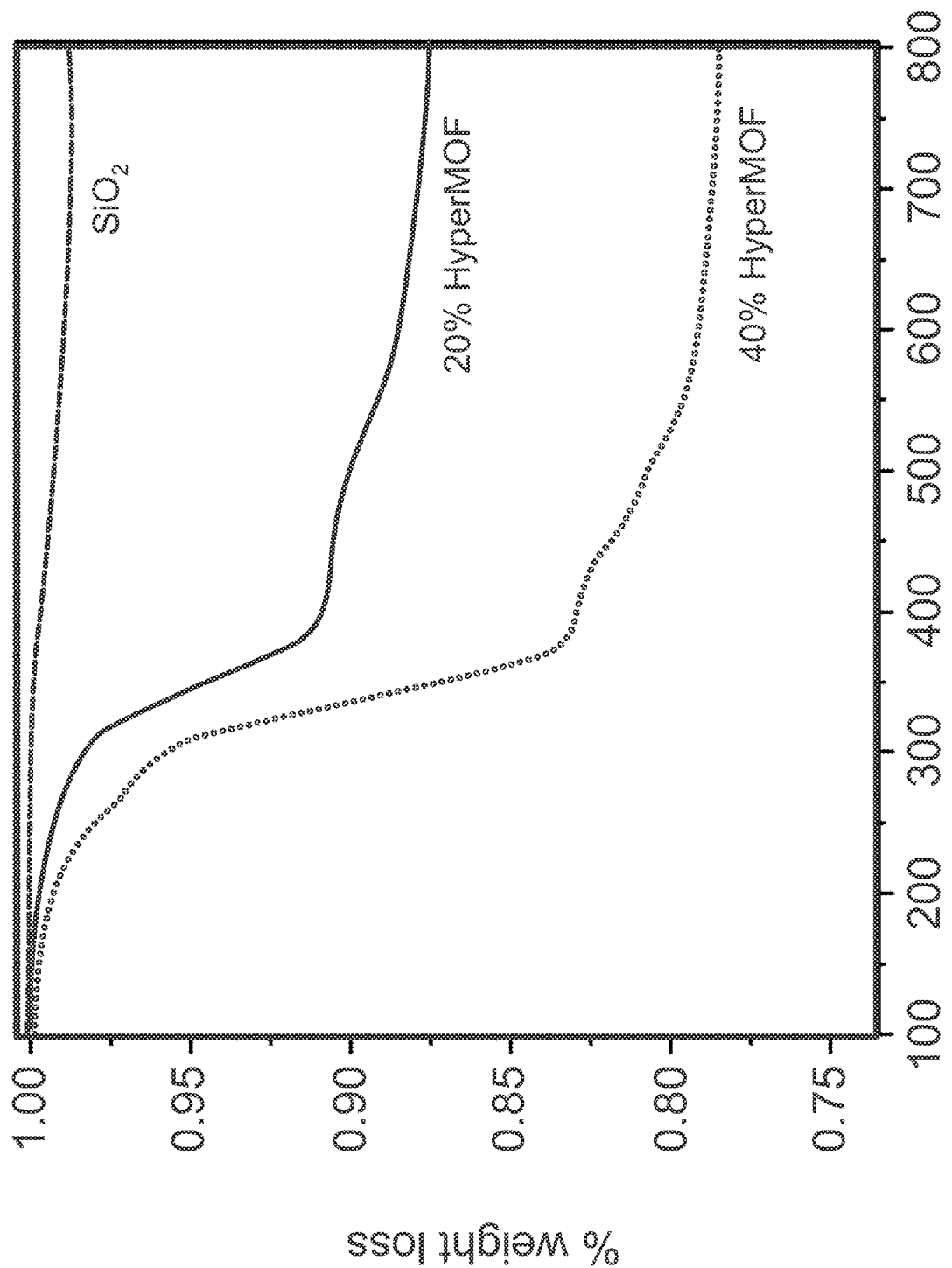
FIG. 10 is the thermogravimetric analysis (TGA) plots of two hybrid materials HyperMOF with different MOF loadings (20% and 40%) and bare $SiO_2$.
Figure 11:
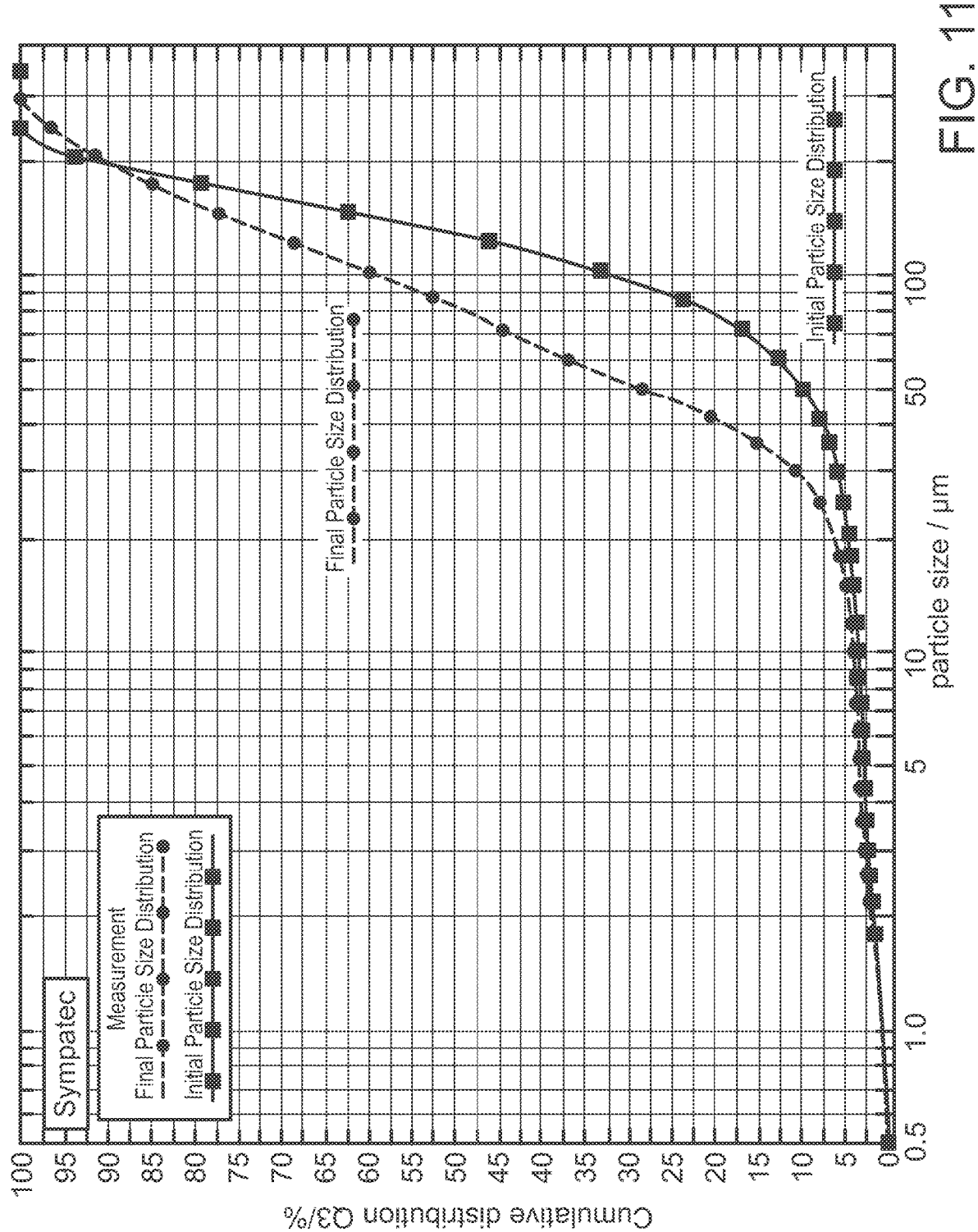
FIG. 11 is a plot depicting initial particle size distribution and final particle size distribution for the 20% HyperMOF hybrid material by the Jet Cup attrition index.

The MOF content of the hybrid materials was quantified by TGA and XRF analysis. FIG. 10 is the TGA profiles of two hybrid materials HyperMOF with different MOF loadings (20% and 40%), as well as the isotherm of bare $SiO_2$. The TGA profiles showed a weight loss around 350° C. attributed to the organic ligand corresponding to 12% and 22% for the 20% and 40% loadings of the MOF on $SiO_2$, respectively, based on the molecular formula of the MOF. These results are similar to the MOF contents calculated from the Cr metal contents measured by XRF on the hybrid materials, which was found to be 3.2% and 6.7% for the 20% and 40% loadings of the MOF on $SiO_2$, respectively. FIG. 11 is a plot depicting initial particle size distribution and final particle size distribution for the 20% HyperMOF hybrid material by the Jet Cup attrition index. The attrition index (%) for the 20% HyperMOF hybrid material was found to be 10.69% compared to that of bare silica ($SiO_2$) found to be 20.15%.

Example 4

Figure 12A:
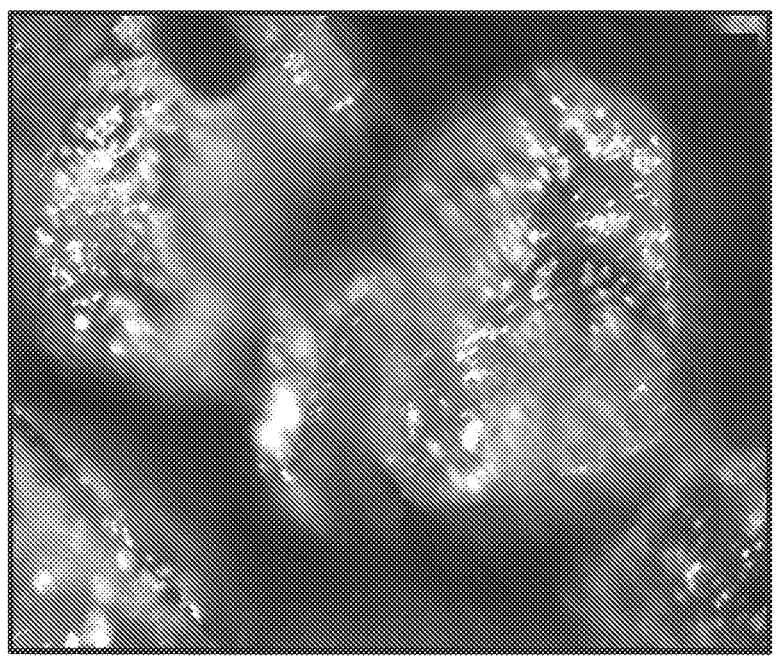
FIG. 12A is a Z-polarized confocal microscope image of a hybrid material obtained by a conventional solvothermal approach.
Figure 12B:
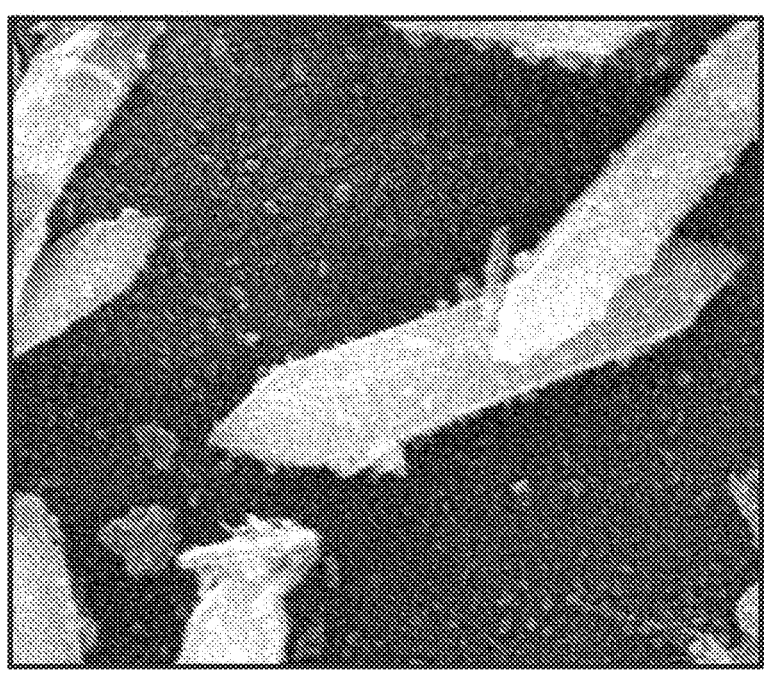
FIG. 12B is a SEM image of a hybrid material obtained by a conventional solvothermal approach.

Comparison of the Prepared Metal Organic Framework (MOF) and Mesoporous Material (MPM) Hybrid Materials (MOF/MPM) with the Conventional Solvothermal Methods An examination of a typical solvothermal MOF synthesis in the presence of $SiO_2$ at varying $SiO_2$/ligand ratios (ranging from 15 to 45) revealed the poor adhesion of the MOF crystallites on the $SiO_2$ surface. This led to highly heterogeneous hybrid materials which showed the coexistence of bare $SiO_2$ particles, partially/fully MOF loaded $SiO_2$, and aggregates of bulk MOF crystallites on the $SiO_2$ outer surface. The Z-polarized confocal microscope image and SEM image of a hybrid material obtained by this approach are shown. FIG. 12A is a Z-polarized confocal microscope image of the hybrid material obtained by a conventional solvothermal method. FIG. 12B is a SEM image of the hybrid material obtained by a conventional solvothermal method. This heterogeneous MOF loading on $SiO_2$ using solvothermal conditions was found to be similar to that of other reported MOFs on the surface of different supports including $SiO_2$. This confirmed the efficiency and superiority of the method described in the present disclosure compared to other solvothermal methods.

Figure 13:
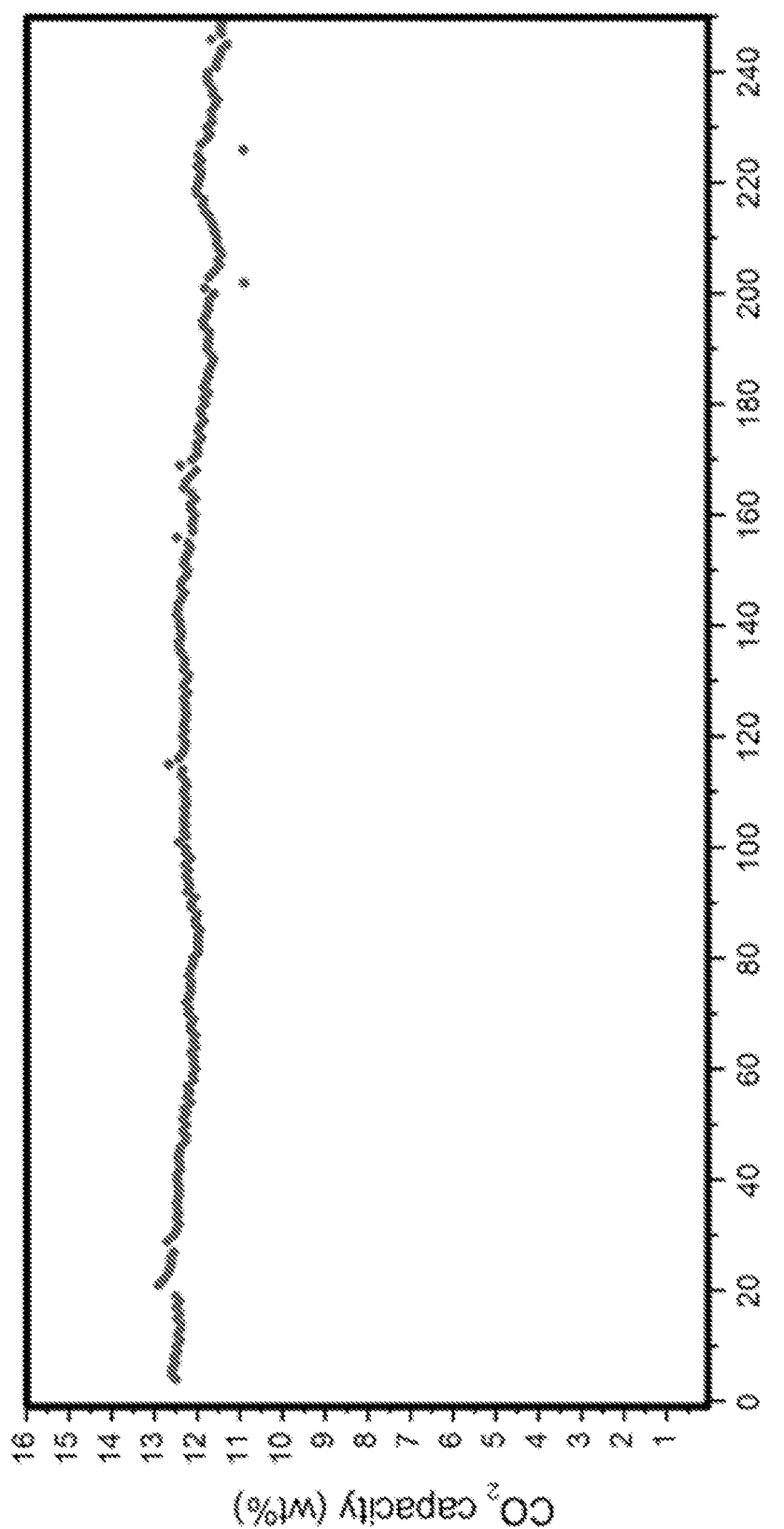
FIG. 13 is example of the excellent $CO_2$ adsorption capacity during 250 cycles and stability of a fluidized HyperMOF containing polyamine in a packed-bed reactor under realistic flue gas conditions ($CO_2$=15 vol %, 02=4.5 vol %, and $H_2O$=5.6 vol % in balance with $N_2$ at 50° C. for the adsorption step, and $H_2O$=5.6 vol % in balance with $N_2$ at 120° C. for regeneration step).
Figure 14:
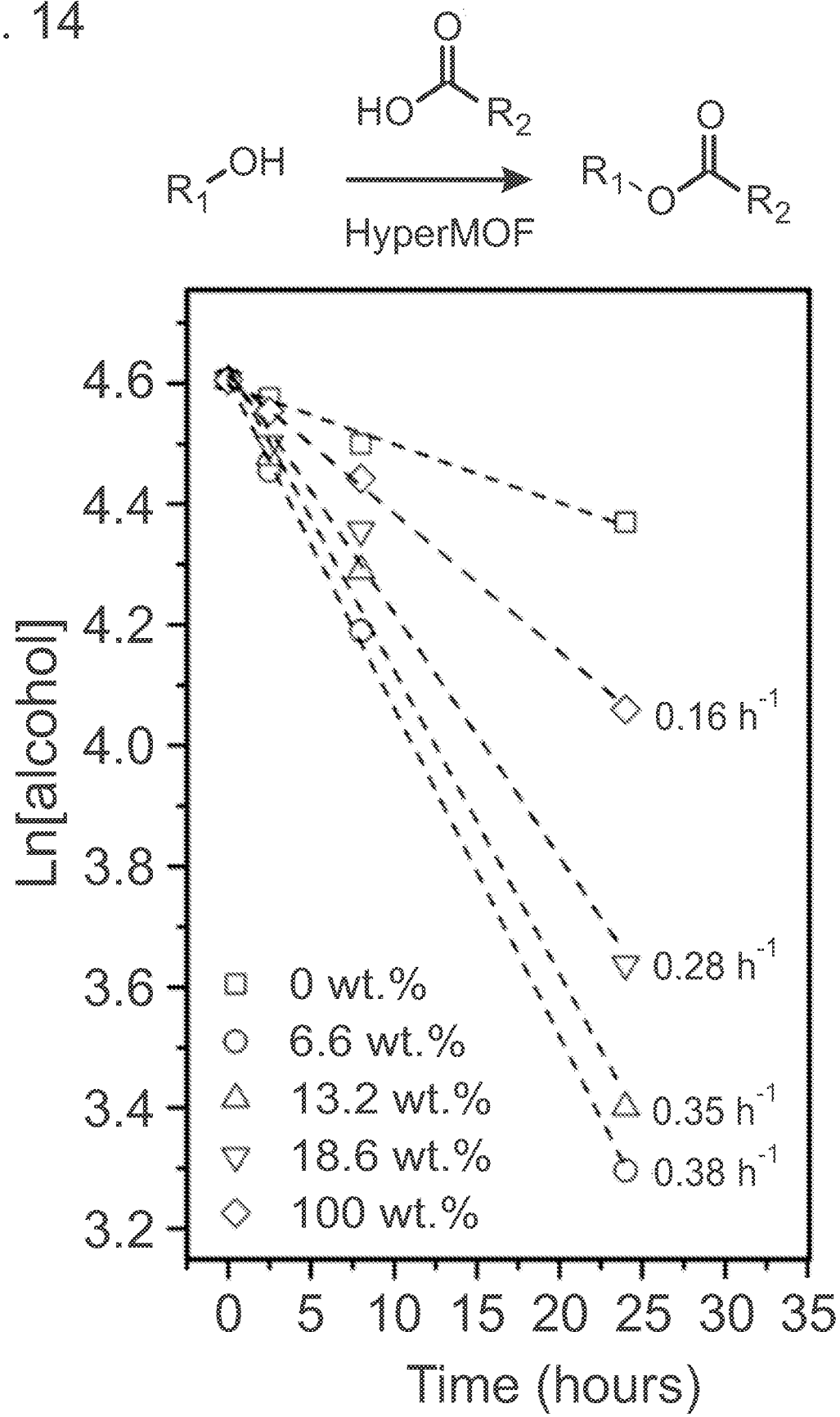
FIG. 14 is an example of superior catalytic activity of HyperMOFs for esterification of alcohols showing the turnover frequency (TOF) for HyperMOF catalysts containing varying loading of MOF nanocrystals within a mesoporous silica compared to bulk MOF (100 wt. %).

FIG. 13 is example of the excellent $CO_2$ adsorption capacity during 250 cycles and stability of a fluidized HyperMOF containing polyamine in a packed-bed reactor under realistic flue gas conditions ($CO_2$=15 vol %, 02=4.5 vol %, and $H_2O$=5.6 vol % in balance with $N_2$ at 50° C. for the adsorption step, and $H_2O$=5.6 vol % in balance with $N_2$ at 120° C. for regeneration step). FIG. 14 is an example of superior catalytic activity of HyperMOFs for esterification of alcohols showing the turnover frequency (TOF) for HyperMOF catalysts containing varying loading of MOF nanocrystals within a mesoporous silica compared to bulk MOF (100 wt. %).

Figure 15:
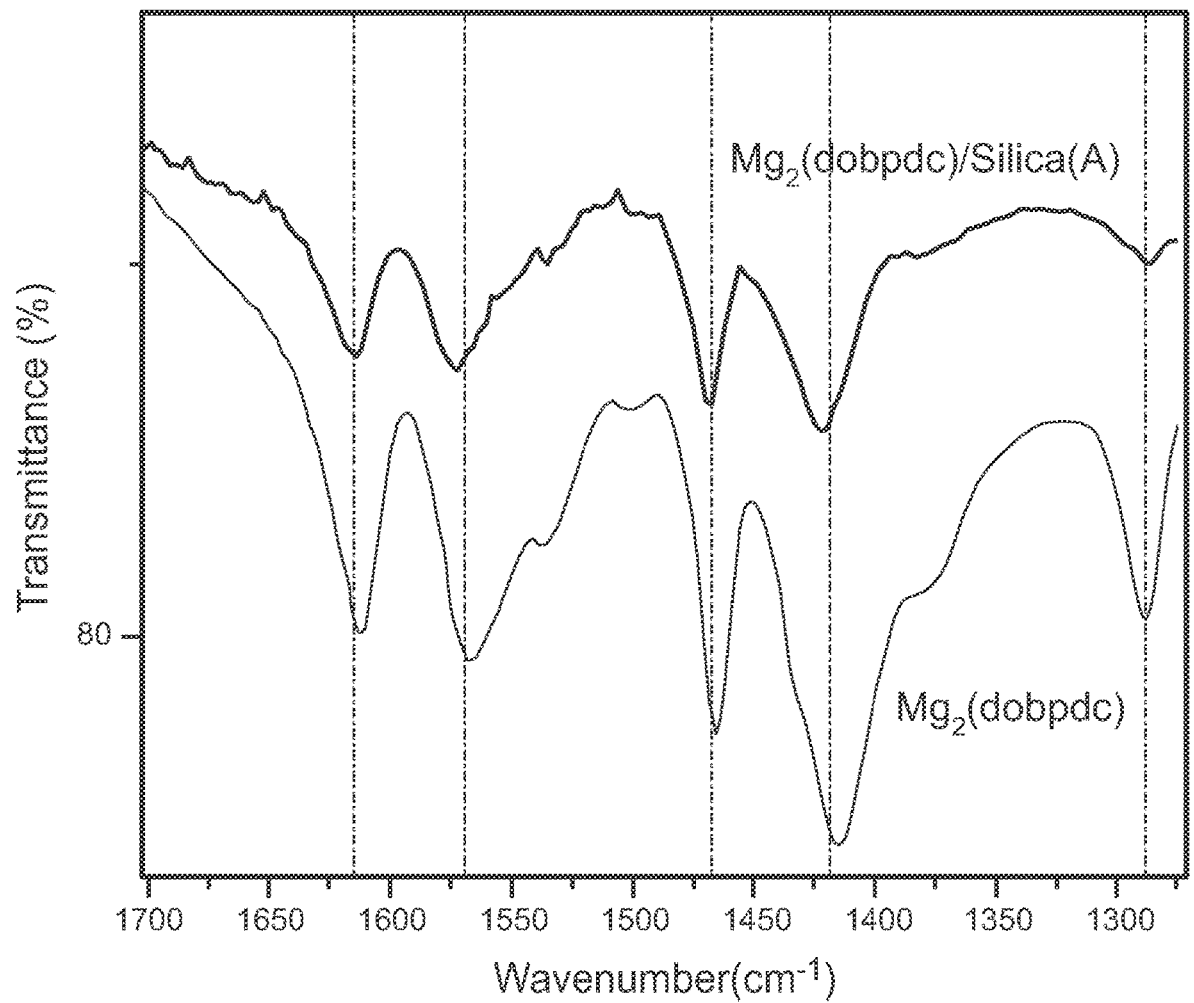
FIG. 15 is the Fourier Transform Infrared (FTIR) spectra of the hybrid material HyperMOF ($Mg_2$(dobpdc)) (upper line) and bulk MOF (lower line) prepared by alternative method C (FIG. 16C).

FIG. 15 is the Fourier Transform Infrared, (FTIR) spectra of the hybrid material HyperMOF ($Mg_2$(dobpdc)/Silica(A)) (upper line) and bulk MOF (lower line) prepared by alternative method C. The material was obtained by impregnation of a solution of dobpdc ligand in DMF on mesoporous silica (A) containing $Mg_0$ nanoparticles upon applying the synthesis conditions of alternative C (FIG. 16C).

Figure 16A:
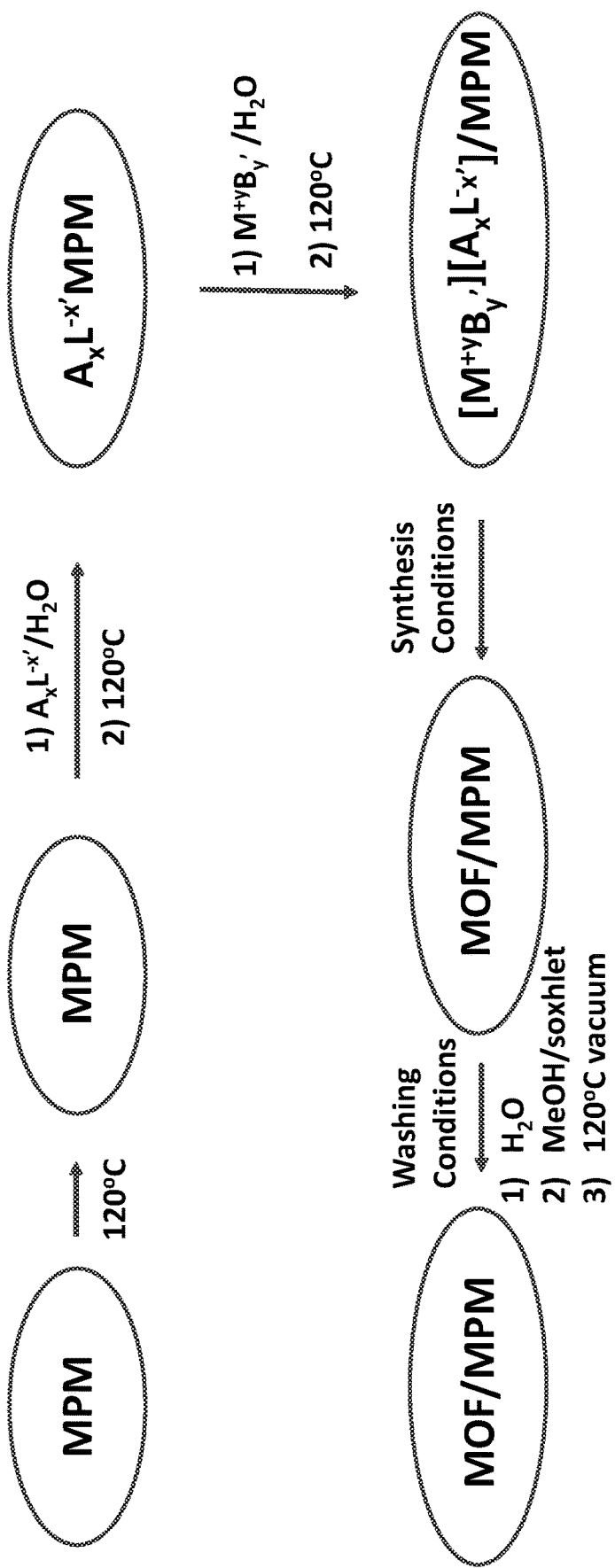
FIG. 16A is a scheme describing alternative method A for the solid-state crystallization and preparation of MOF/MPMs.

FIG. 16A is a scheme describing alternative method A for the solid-state crystallization and preparation of MOF/MPMs. First step, ligand salt impregnation. Second step, metal salt impregnation. Final step, application of synthesis conditions and crystallization of MOF nanocrystals.

Figure 16B:
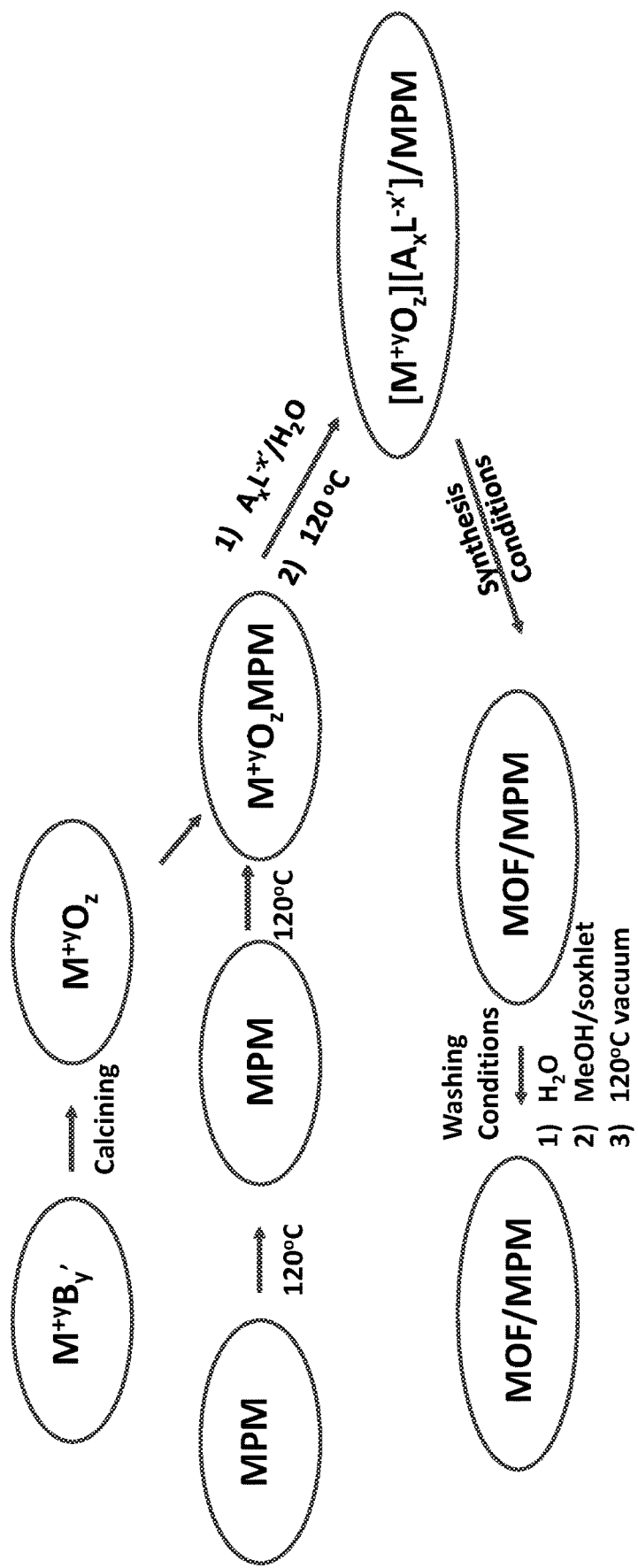
FIG. 16B is a scheme describing alternative method B for the solid-state crystallization and preparation of MOF/MPMs.

FIG. 16B is a scheme describing alternative method B for the solid-state crystallization and preparation of MOF/MPMs. First step, metal nanoparticle preparation by calcination under air at 500° C. of an impregnated metal salt. Second step, ligand salt impregnation. Final step, application of synthesis conditions and crystallization of MOF nanocrystals.

Figure 16C:
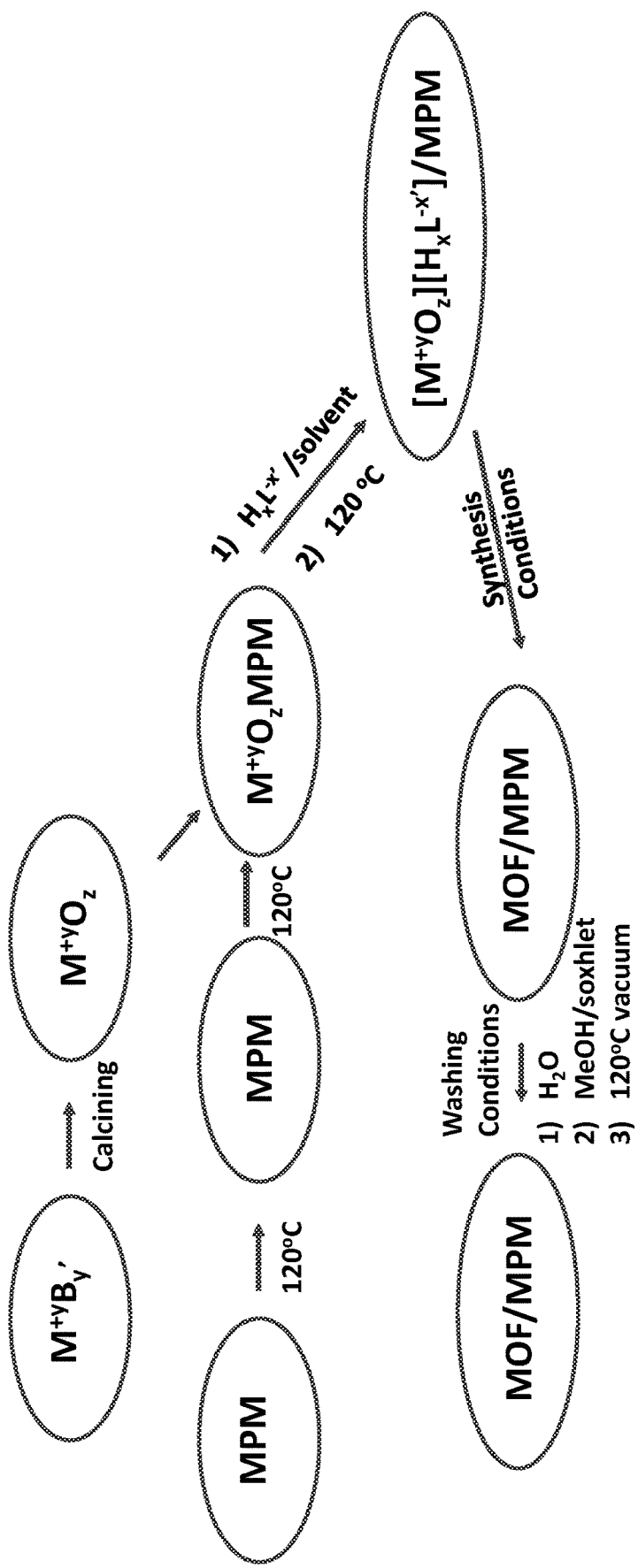
FIG. 16C is a scheme describing alternative method C for the solid-state crystallization and preparation of MOF/MPMs.

FIG. 16C is a scheme describing alternative method C for the solid-state crystallization and preparation of MOF/MPMs. First step, metal nanoparticle preparation by calcination under air at 500° C. of an impregnated metal salt. Second step, ligand impregnation (acid form). Final step, application of synthesis conditions and crystallization of MOF nanocrystals. See Luz et al. *Chemistry of Materials* 2016 28 3839-3849; and Hung et al. Advanced Materials 2010 22 1910-1914 (the entire contents of which are incorporated herein by reference). In a preferred embodiment, the solid metal oxide nanoparticles are prepared using the method of Hung et al.

FIG. 17 is a scheme describing one embodiment of the solid-state crystallization approach. First step, ligand salt impregnation (a). Second step, gas phase acidification (b). Third step, metal salt impregnation (c). Final step, application of synthesis conditions and crystallization of MOF nanocrystals (d).

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

Example of Application 1

A collection of polyamine impregnated HyperMOFs has been tested for $CO_2$ capture under realistic flue gas conditions in a packed-bed reactor and in a fluidized-bed reactor, and compared to the-state-of-art sorbents composed by polyamines on both 'fluidized' silica and 'non-fluidized' bulk MOFs. This systematic study reveals the correlations between the features of HyperMOFs, such as loading, composition and functionality of confined MOF, and the performance of impregnated polyamines HyperMOFs for $CO_2$ capture. The most promising materials have been evaluated for long-term stability in a packed-bed reactor and fluidized-bed reactor as well as a techno-economic study has been carried out to compare with state-of-the-art solid sorbents. An example of the excellent $CO_2$ capacity and stability of one of the most promising polyamine impregnated MOF/$SiO_2$ hybrid sorbents is shown in FIG. 13.

Sanz-Perez et al. (the entire contents of which are incorporated herein by reference) discloses a number of MOF based sorbents for $CO_2$ capture. Sanz-Perez, E. S.; Murdock, C. R.; Didas, S. A.; Jones, C. W.: Direct Capture of $CO_2$ from Ambient Air. *Chemical Reviews* 2016, 116, 11840-11876. Specifically, they disclose two major methods that MOFs are used to capture $CO_2$. In one method, the MOF is used for directly capture of $CO_2$. Examples of the MOFs used for this method are SIFSIX-3-M (where the metal is Cu, Zn or Ni), HKUST-1, and Mg-MOF-74. In another method, the MOF is used to tether amines that then capture $CO_2$ by forming ammonium carbonates. Examples of the amine tethered MOFs are Mg-MOF-74 and $MMENM_2$(dobpdc) where M=Mg, Mn, Fe, Co, Ni, and Zn, MMEN=N,N'-dimethylethylenediamine, and dobpdc=4,4'-dihydroxy-(1,1'-biphenyl)-3,3'-dicarboxylic acid). See Sanz-Perez Table 5 on p. 11862. Here, in one embodiment of the disclosure, absorbents are made using the novel methods described herein to make hybrid structures (MOF/MPMs) based on the Sanz-Perez et al. MOFs for the capability of absorption of $CO_2$.

Example of Application 2

HyperMOFs materials can elegantly address some of the challenges that MOFs are experiencing as heterogeneous catalysts, in particular their chemical and thermal stability as well as handling. First, the concentration of outer crystal surface coordination vacancies is boosted by reducing the MOF crystalline domain down to a few nanometers via confinement within the mesoporous scaffold. Second, the matrix confers additional stability to the MOF nanocrystals, avoiding the fragmentation and further loss of the catalytically active sites as well as overcoming the diffusion limitations (or pore blockage) of bulk microporous MOF particles when bulky molecules are involved in the catalytic reaction, thereby favouring the availability of isolated active sites through a hierarchical meso-/microporous system. Also, engineering MOF nanocrystals within mesoporous solid materials can shape MOFs to catalytic applications by imparting sphericity to MOF particles for more feasible handling, and also protecting MOF structures from physical forces which could cause attrition of the bulk particles in fluidized processes. As example of these statements, HyperMOFs have been confined within mesoporous silica materials and have demostrated superior catalytic activity as heterogeneous catalysts for organic reactions of potential interest, such as esterification of alcohols, compared to their bulk counterpart (See FIG. 14).

Corma et al. (the entire contents of which are incorporated herein by reference) disclose a number of additional reactions catalyzed by MOFs. See Corma, A.; Garcia, H.; Llabrés i Xamena, F. X.: Engineering Metal Organic Frameworks for catalysis *Chemical Reviews* 2010, 110, 4606-4655. In particular, they disclose Ru or Rh MOF hydrogenation or isomerization reactions, radical polymerization of styrene, anionic polymerization of acetylenes, oxidation of alkanes or alkenes, and photocatalysis reactions. See Corma et al. Table 3 at p. 4616. Here, in one embodiment of the disclosure, catalysts are made using the methods described herein to make hybrid structures (MOF/MPMs) based on the Corma et al. to catalyze for the catalyzing other reactions beyond the esterification described above.

Van de Voorde et al. (the entire contents of which are incorporated herein by reference) disclose a number of applications of MOFs to separate different compounds. Van de Voorde, B.; Bueken, B.; Denayer, J.; De Vos, D.: Adsorptive separation on metal-organic frameworks in the liquid phase. *Chemical Society Reviews* 2014, 43, 5766-5788. In particular, in FIG. 16 they disclose HKUST-1 provides improved method of separating ethylbenzene from styrene. See also Ameloot et al. *European J. Inorganic Chemistry* 2010 3735-3739. Here, in another embodiment of the disclosure, gas and liquid chromatographic columns are made using the methods described herein and include the novel hybrid structures (MOF/MPMs) based on the Van de Voorde et al. MOFs for adsorption and gas and liquid phase separations.

OTHER APPLICATIONS

The hybrid materials described above can be used in a number of applications including use of the hybrid materials as gas adsorbents, or catalysts, or in a drug delivery carrier, a proton conductive material, a sensor, and/or an optoelectronic device and other applications as described below.

U.S. Pat. No. 7,534,303 (the entire contents of which are incorporated herein by reference) describes a method for the absorption of liquids, which comprises the step of bringing the liquid into contact with at least one sorbent comprising a porous metal-organic framework, the framework taking up the liquid and comprising at least one at least bidentate organic compound having a coordinate bond to at least one metal ion. Solids are frequently required for binding liquids in or to them in order to ensure that these liquids do not spread or come into contact with other liquids or solids or to make the abovementioned liquids capable of being handled. A further frequent case where liquids have to be taken up in or on solids in order to avoid contamination of the floor or the air occurs in traffic accidents or other vehicle accidents. Emerging liquids, such as gasoline, motor oil, gear oil and the like, have to be appropriately treated. By taking up liquids, such as disinfectant or odoriferous substances, in solids is advantageous since the abovementioned handling properties are facilitated by the solid, and the liquid can be released via the gas phase to the environment, for example the room air, by the solid in a controlled manner. Here, in one embodiment of the disclosure, absorbents are made using the novel methods described above and include the novel hybrid structures described above for the capability of absorption of liquids.

United States Patent Application 2015/0047505 (the entire contents of which are incorporated herein by reference) describes a metal organic framework having a metal ion (M) and an organic ligand wherein more than one hydroxy ligand is present about the metal ion. The metal-organic frameworks of the '505 application were utilized in areas including scrubbing exhaust gas streams of acidic gases, scrubbing natural gas of acidic gases by separation or sequestration and separating $C_2H_a$ or other VOC gases from other gas mixtures. Here, in one embodiment of the disclosure, gas scrubbers are made using the novel methods described above and include the novel hybrid structures described above for the capability of exhaust gas stream scrubbing.

United States Patent Appl. No. 2008/0306315 (the entire contents of which are incorporated herein by reference) describes porous heterogeneous catalyst material including frameworks of inorganic cornerstones connected by organic bridges, characterized in that as organic bridges are used ligands having a complexed catalytically active metal. The '315 application describes a Wacker process for oxidizing ethene to acetaldehyde using a Pd(II) (e.g. PdCl2) catalyst, the catalyst is reduced to Pd and thus Cu(II) (e.g. $CuCl_2$) is used as a co-catalyst to reactivate the palladium to Pd(II), itself becoming reduced to Cu(I). The '315 application describes a co-catalyst may displace one of the ligands on the catalytic metal; thus, for example HSO-4 may be used to displace chloride ligands in the (bpym)$PtCl_2$ catalyst used for methane oxidation. Here, in one embodiment of the disclosure, catalysts materials are made using the novel methods described above and include the novel hybrid structures described above for the capability of hydrocarbon reformation.

United States Patent Appl. No. 2007/0068389 (the entire contents of which are incorporated herein by reference) describes a carbon dioxide storage system includes a container and a conduit attached to the container for introducing or removing a carbon dioxide-containing composition from the container. In the '389 application, a carbon dioxide storage material is positioned within the container and includes a metal-organic framework, which has a sufficient surface area to store at least 10 carbon dioxide molecules per formula unit of the metal-organic framework at a temperature of about 25° C. Here, in one embodiment of the disclosure, catalysts materials are made using the novel methods described above and include the novel hybrid structures described above for the capability of carbon dioxide (or other gas) storage.

U.S. Pat. No. 8,691,748 (the entire contents of which are incorporated herein by reference) describes edible and biocompatible metal-organic frameworks in which the materials of the organic frameworks are useful to store and separate biological agents that are environmentally friendly and biocompatible. The '748 application describes biocompatible metal organic frameworks (bMOFs) developed from non-toxic starting materials, which can be utilized in drug storage and delivery, flavoring and drying agents in food, catalysis, tissue engineering, dietary supplements, separation technology and gas storage. The '748 application describes bMOFs which are porous and capable of storing, within the pores of the framework, drugs; absorbing biomolecules; being used as a framework for tissue engineering and scaffolds; expansion within the gastrointestinal tract to serve as a dietary supplement; and the like. Here, in one embodiment of the disclosure, biocompatible metal-organic frameworks on biocompatible mesoporous materials are made using the novel methods described above and include the novel hybrid structures described above for the capability of storing biological agents in structures that are environmentally friendly and biocompatible.

U.S. Pat. No. 7,824,473 (the entire contents of which are incorporated herein by reference) in its background describes that MOFs have attracted great interest for numerous applications including ion exchange, heterogeneous catalysis, optoelectronics, gas separation, gas sensing, and gas storage, in particular $H_2$ storage. Here, in different embodiments of the disclosure, metal-organic frameworks are made using the novel methods described above and include the novel hybrid structures described above for utilization in these applications included but not limited to ion exchange, heterogeneous catalysis, optoelectronics, gas separation, gas sensing, and gas storage, in particular $H_2$ storage.

U.S. Pat. No. 9,623,404 (the entire contents of which are incorporated herein by reference) describes a number of MOF based catalysts for the detoxification of chemical weapons. In particular, they disclose MOF NU-1000 ($Zr^{+4}$ & 1,3,6,8-tetrakis(p-benzoic acid) pyrene) and UiO-66 (Zr BDC) for nerve agents such as organophosphorus containing compounds. Here, in another embodiment of the disclosure, compositions for detoxifying nerve agents are made using the methods described herein and include the novel hybrid structures (MOF/MPMs) based on the U.S. Pat. No. 9,623,404 disclosure to make novel materials and devices to detoxify nerve agents.

Chinese Patent No. 106861649 (the entire contents of which are incorporated herein by reference) describes a number of MOF based catalysts for UMCM-150, HKUST-1, MOF-5, MOF-177, MOF-505 and MOF-74 (Ni) on γ-$Al_2O_3$ for the desulfurization of liquid fuels. These MOFs on silica show improved adsorption capacity than either the MOF or γ-$Al_2O_3$ alone. Thus, in yet another embodiment of the disclosure, compositions for the adsorption of sulfur containing compounds and desulfurization of liquid fuels are made using the novel methods described herein and include the novel hybrid structures (MOF/MPMs) based on MOFs. Specifically, UMCM-150, HKUST-1, MOF-5, MOF-177, MOF-505 and MOF-74 (Ni) may be used following the methods described herein to make novel MOF/MPM materials for fuel desulfurization.

7. GENERALIZED STATEMENTS OF THE DISCLOSURE

The following numbered statements provide a general description of the disclosure and are not intended to limit the appended claims.

A method, comprising: contacting an aqueous solution of an organic ligand salt of the formula $A_x(L^{-x})$ with a mesoporous material (MPM) to form an impregnated mesoporous salt material of the formula Ax(L-x)/MPM where A is a counter ion, x is a whole number, and L is an organic ligand; treating the impregnated mesoporous salt material with an aqueous acidic solution to form an impregnated mesoporous acid material of the formula Hx(L-x)/MPM where H is hydrogen; contacting an aqueous solution of a metal precursor of the formula $M^{+y}(B)_y$ with the impregnated mesoporous acid material to form an impregnated mesoporous metal organic framework precursor of the formula $[M^{+y}(B)_y][H_x(L^{-x})]$/MPM where M is a metal, y is a whole number, and B is an anion; and at least one of 1) heating the impregnated mesoporous metal organic framework precursor in the absence of a solvent or 2) exposing the impregnated mesoporous metal organic framework precursor to a volatile vapor in the absence of a solvent such that the heating or the exposing forms a hybrid material of the formula $(M^{+y}L^{-x})$/MPM; wherein the hybrid material comprises a nano-crystalline metal organic framework (MOF) embedded within the mesoporous material. The present disclosure is not limited to the order of these recited elements and is not limited to having each and every element contained these recited elements.

Moreover, in various aspects of the disclosure, the concentration of the ligand salts in aqueous solution can vary between 50-250 mg/mL $H_2O$. Although in a few cases, ligands in their acid form such as 2,6-dihydroxyterephthalic acid can also be dissolved and impregnated in water or organic solvents such as methanol, ethanol, tetrahydrofuran, N,N'-dimethylformamide, acetonitrile, acetone but at lower concentrations (below 100 mg/mL), thus skipping the intermediate step of ligand acidification.

More particularly, the present disclosure can involve methods different than the above note heating and exposing in the absence of a solvent such that at least one of 1) heating the impregnated mesoporous metal organic framework precursor can occur in the presence of a catalytic amount of a solvent or 2) exposing the impregnated mesoporous metal organic framework precursor to a volatile vapor can occur in the presence of a catalytic amount of a solvent such that the heating or the exposing forms a hybrid material of the formula $(M^{+y}L^{-x})$/MPM. In this alternative, the hybrid material comprises a nano-crystalline metal organic framework (MOF) embedded within the mesoporous material, and the nano-crystalline metal organic framework is homogeneously dispersed and substantially present only within the mesopores or void spaces of the mesoporous material. Additionally, the solvent is at least one selected from the group consisting of water, ethanol, methanol, tetrahydrofuran, and N,N-dimethylformamide and is present in a weight amount of less than 75% of the weight amount of the hybrid material formed.

Statement 1: A method, comprising:

contacting an aqueous solution of an organic ligand salt of the formula $A_x(L^{-x})$ with a mesoporous material (MPM) to form an impregnated mesoporous salt material of the formula $A_x(L^{-x})$/MPM where A is a counter ion, each x is independently a whole number, and L is an organic ligand;

treating the impregnated mesoporous salt material with an aqueous acidic solution to form an impregnated mesoporous acid material of the formula $H_x(L^{-x})$/MPM where H is hydrogen; contacting an aqueous solution of a metal precursor of the formula $M^{+y}(B)_y$ with the impregnated mesoporous acid material to form an impregnated mesoporous metal organic framework precursor of the formula $[M^{+y}(B)_y][H_x(L^{-x})]$/MPM where M is a metal, each y is independently a whole number, and B is an anion; and at least one of 1) heating the impregnated mesoporous metal organic framework precursor in the absence of a solvent or 2) exposing the impregnated mesoporous metal organic framework precursor to a volatile vapor in the absence of a solvent such that the heating or the exposing forms a hybrid material of the formula $(M^{+y}L^{-x})$-MPM;

wherein the hybrid material comprises a nano-crystalline metal organic framework (MOF) embedded within the mesoporous material.

Statement 2: A method, comprising: contacting an aqueous solution of an organic ligand salt of the formula $A_x(L^{-x})$ with a mesoporous material (MPM) to form an impregnated mesoporous salt material of the formula Ax(L-x)/MPM where A is a counter ion, each x is independently a whole number, and L is an organic ligand;

contacting an aqueous solution of a metal precursor of the formula $M^{+y}(B)_y$ with the impregnated mesoporous salt material to form an impregnated mesoporous metal organic framework precursor of the formula $[M^{+y}(B)_y][A_x(L^{-x})]$/MPM where M is a metal, each y is independently a whole number, and B is an anion; and at least one of 1) heating the impregnated mesoporous metal organic framework precursor in the absence of a solvent or 2) exposing the impregnated mesoporous metal organic framework precursor to a volatile vapor in the absence of a solvent such that the heating or the exposing forms a hybrid material of the formula $(M^{+y}L^{-x})$-MPM;

wherein the hybrid material comprises a nano-crystalline metal organic framework (MOF) embedded within the mesoporous material.

Statement 3: A method, comprising: impregnation of an aqueous solution of a metal salt of the formula $M^{+y}(B)_y$ on a mesoporous material (MPM) to form a metal oxide impregnated mesoporous material (upon heating treatment under air up to 500° C.) of the formula $M^{+y}(O)_y$/MPM where M is a metal and each y is independently a whole number; contacting the metal oxide impregnated mesoporous material with (i) an aqueous solution of an organic ligand salt of the formula $A_x(L^{-x})$ to form an impregnated mesoporous metal organic framework precursor of the formula $[M^{+y}(O)_y][A_x(L^{-x})]$/MPM or (ii) an organic solvent of solution of a ligand $H_x(L^{-x})$ to form an impregnated mesoporous metal organic framework precursor of the formula $[M^{+y}(O)_y][H_x(L^{-x})]$/MPM, where L is a ligand, A is a counter ion and each x is independently a whole number; and at least one of 1) heating the impregnated mesoporous metal organic framework precursor in the absence of a solvent or 2) exposing the impregnated mesoporous metal organic framework precursor to a volatile vapor in the absence of a solvent such that the heating or the exposing forms a hybrid material of the formula $(M^{+y}L^{-x})$-MPM;

wherein the hybrid material comprises a nano-crystalline metal organic framework (MOF) embedded within the mesoporous material. In one embodiment, an aqueous solution of an organic ligand salt of the formula $A_x(L^{-x})$ to form an impregnated mesoporous metal organic framework precursor of the formula $[M^{+y}(O)_y][A_x(L^{-x})]$/MPM. In another embodiment, an organic solvent of solution of a ligand $H_x(L^{-x})$ to form an impregnated mesoporous metal organic framework precursor of the formula $[M^{+y}(O)_y][H_x(L^{-x})]$/MPM.

Statement 4: The method of any of statements 1-3, wherein the nano-crystalline metal organic framework is present only within the mesopores or void spaces of the mesoporous material and homogeneously dispersed within the mesopores or void spaces of the mesoporous material.

Statement 5: The method of any of statements 1-4, further comprising drying at least one selected from the group consisting of the impregnated mesoporous salt material, the impregnated mesoporous acid material, the impregnated mesoporous metal organic framework precursor, and the hybrid material at a temperature in the range of 25-160° C. under a vacuum.

Statement 6: The method of any of statements 1-5, further comprising: washing the hybrid material with distilled water; and extracting water from the hybrid material in a Soxhlet system recycling methanol.

Statement 7: The method of any of statements 1-6, wherein the mesoporous material is at least one selected from the group consisting of a mesoporous metal oxide (aluminum oxide, cerium oxide, titanium oxide, zirconium oxide, magnesium oxide, etc.), a mesoporous silica, a mesoporous carbon, a mesoporous polymer, a mesoporous silicoalumina (zeolite), a mesoporous organosilica, and a mesoporous aluminophosphate, etc.).

Statement 8: The method of any one of the statements above, wherein the organic ligand ($L^{-x}$) of the organic ligand salt is at least one selected from the group consisting of polycarboxylate ligands, azaheterocyclic ligands, and derivatives thereof.

Statement 9: The method of any one of the statements above, wherein the organic ligand ($L^{-x}$) of the organic ligand salt is at least one selected from the group consisting of, terephthalate, benzene-1,3,5-tricarboxylate, 2,5-dioxibenzene dicarboxylate, biphenyl-4,4'-dicarboxylate and derivatives thereof.

Statement 10: The method any one of the statements above, wherein the organic ligand ($L^{-x}$) of the organic ligand salt is at least one selected from the group consisting of imidazolate, pyrimidinazolate, triazolate, and derivatives thereof.

Statement 11: The method of any one of the statements above, wherein the metal ($M^{+y}$) of the metal precursor is at least one transition metal selected from the group consisting of Mg, V, Cr, Mo, Zr, Hf, Mn, Fe, Co, Cu, Ni, Zn, Ru, Al, and Ga.

Statement 12: The method of any one of the statements above, wherein the metal organic framework is at least one selected from the group consisting of MIL-101, MIL-100, MIL-53, MOF-74, UiO-66, UiO-67, ZIF-8, ZIFs, HKUST-1, $M_2$(dobpdc), NU-1000, PCN-222, PCN-224, and derivatives thereof.

Statement 13: The method of any one of the statements above, wherein the hybrid material has a weight percentage of the metal organic framework in the range of 5-50% relative to the total weight of the hybrid material.

Statement 14: The method of any one of the statements above, wherein the hybrid material comprises mesopores with an average diameter in the range of 2-50 nm and micropores with an average diameter in the range of 0.5-5.0 nm.

Statement 15: The method of any one of the statements above, wherein the mesopores, the micropores, or both are monodisperse having a coefficient of variation of less than 10%.

Statement 16: The method of any one of the statements above, wherein the nano-crystalline metal organic framework has an average longest linear dimension of less than 40 nm.

Statement 17: The method of any one of the statements above, wherein the hybrid material has a surface area in the range of 200-1200 $m^2$/g.

Statement 18: The method of any one of the statements above, wherein the hybrid material has a surface area in the range of 105-500% that of the surface area of the impregnated mesoporous salt material.

Statement 19: The method of any one of the statements above, wherein the hybrid material has an average longest linear dimension of 100-500 μm.

Statement 20: A hybrid material (optionally made by any one of the methods described in the statements above), comprising: a mesoporous material comprising mesopores; and a nano-crystalline metal organic framework comprising micropores; wherein the nano-crystalline metal organic framework is homogeneously dispersed and substantially present only within the mesopores or void spaces of the mesoporous material; and wherein the hybrid material has a weight percentage of the metal organic framework in the range of 5-50% relative to the total weight of the hybrid material. The present disclosure is not limited to the order of these recited elements and is not limited to having each and every element contained these recited elements.

Statement 21: The hybrid material of statement 20, wherein the nano-crystalline metal organic framework is homogeneously dispersed and only present within the mesopores or void spaces of the mesoporous material.

Statement 22: The hybrid material of any of statements 20-21, wherein the mesopores have an average diameter in the range of 2-50 nm and the micropores have an average diameter in the range of 0.5-5.0 nm.

Statement 23: The hybrid material of any of statements 20-22, wherein the mesopores, the micropores, or both are monodisperse having a coefficient of variation of less than 10%.

Statement 24: The hybrid material of any of statements 20-23, wherein the nano-crystalline metal organic framework has an average longest linear dimension of less than 40 nm.

Statement 25: The hybrid material of any of statements 20-24, which has a surface area in the range of 200-1200 $m^2/g$.

Statement 26: The hybrid material of any of statements 20-25, wherein the mesoporous material is at least one selected from the group consisting of a mesoporous metal oxide (aluminum oxide, cerium oxide, titanium oxide, zirconium oxide, magnesium oxide, etc.), a mesoporous silica, a mesoporous carbon, a mesoporous polymer, and a mesoporous hybrid material (such as silicoalumina (zeolite), organosilica, aluminophosphate, etc.)

Statement 27: The hybrid material of any of statements 20-26, wherein the metal organic framework, comprises at least one metal selected from the group consisting of Mg, V, Cr, Mo, Zr, Hf, Mn, Fe, Co, Cu, Ni, Zn, Ru, Al, and Ga.

Statement 28: The hybrid material of any of statements 20-27, wherein the metal organic framework comprises at least one organic ligand selected from the group consisting of polycarboxylate ligands, azaheterocyclic ligands, and derivatives thereof.

Statement 29: The hybrid material of any of statements 20-28, wherein the metal organic framework is at least one selected from the group consisting of MIL-101, MIL-100, MIL-53, MOF-74, UiO-66, UiO-67, ZIF-8, ZIFs, HKUST-1, $M_2$(dobpdc) NU-1000, PCN-222, PCN-224, and derivatives thereof.

Statement 30: The hybrid material of any of statements 20-29, which has an average longest linear dimension of 100-500 μm.

Statement 31: A gas adsorbent comprising the hybrid material of any one of statements 20-30.

Statement 32: A method of adsorbing, separating, storing or sequestering at least one gas, comprising: contacting the gas adsorbent of statement 31 with the at least one gas; wherein the at least one gas is selected from the group consisting of hydrogen ($H_2$), hydrogen sulfide ($H_2S$), sulfur dioxide ($SO_2$), methane ($CH_4$) and carbon dioxide ($CO_2$).

Statement 33: A catalyst comprising the hybrid material of any one of statements 20-30.

Statement 34: A method of catalyzing a reaction, comprising: reacting a substrate in the presence of the catalyst of statement 33.

Statement 35: A device or material comprising the hybrid material of any one of statements 20-30, wherein the device or material is at least one selected from the group consisting of a drug delivery carrier, a proton conductive material, a sensor and an optoelectronic device.

Statement 36. A method, comprising:
contacting an aqueous solution of an organic ligand salt of the formula $A(L^{-x})$ with a mesoporous material (MPM) to form an impregnated mesoporous salt material of the formula $A_x(L-x)$/MPM where A is a counter ion, x is a whole number, and L is an organic ligand;
treating the impregnated mesoporous salt material with an aqueous acidic solution to form an impregnated mesoporous acid material of the formula $H_x(L^{-x})$/MPM where H is hydrogen;
contacting an aqueous solution of a metal precursor of the formula $M^{+y}(B)_y$ with the impregnated mesoporous acid material to form an impregnated mesoporous metal organic framework precursor of the formula $[M^{+y}(B)_y][H_x(L^{-x})]$/MPM where M is a metal, y is a whole number, and B is an anion; and
at least one of 1) heating the impregnated mesoporous metal organic framework precursor in the presence of a catalytic amount of a solvent or 2) exposing the impregnated mesoporous metal organic framework precursor to a volatile vapor in the presence of a catalytic amount of a solvent such that the heating or the exposing forms a hybrid material of the formula $(M^{+y}L^{-x})$/MPM; wherein the hybrid material comprises a nano-crystalline metal organic framework (MOF) embedded within the mesoporous material;
wherein the nano-crystalline metal organic framework is homogeneously dispersed and substantially present only within the mesopores or void spaces of the mesoporous material; and wherein the solvent is at least one selected from the group consisting of water, ethanol, methanol, tetrahydrofuran, and N,N-dimethylformamide and is present in a weight amount of less than 75% of the weight amount of the hybrid material formed.

Statement 37. The method of statement 36, wherein the solvent is present in a weight amount of less than 50% of the weight amount of the hybrid material formed.

Statement 38. The method of statement 36, wherein the solvent is present in a weight amount of less than 25% of the weight amount of the hybrid material formed.

Statement 39. The method of statement 36, wherein the solvent is present in a weight amount of less than 10% of the weight amount of the hybrid material formed.

Statement 40. The method of statement 36, wherein the solvent is present in a weight amount of less than 5% of the weight amount of the hybrid material formed.

Statement 41. The method of statement 36, wherein the solvent is present in a weight amount of less than 2% of the weight amount of the hybrid material formed.

Statement 42. The method of statement 36, utilizing any of the method statements from Statement 1 to Statement 19.

Numerous modifications and variations of the present disclosure are possible in light of the above teachings. It is therefore to be understood that within the scope of the appended claims, the disclosure may be practiced otherwise than as specifically described herein.

It should be understood that the above description is only representative of illustrative embodiments and examples. For the convenience of the reader, the above description has focused on a limited number of representative examples of all possible embodiments, examples that teach the principles of the disclosure. The description has not attempted to exhaustively enumerate all possible variations or even combinations of those variations described. That alternate embodiments may not have been presented for a specific portion of the disclosure, or that further undescribed alternate embodiments may be available for a portion, is not to be considered a disclaimer of those alternate embodiments.

One of ordinary skill will appreciate that many of those undescribed embodiments, involve differences in technology and materials rather than differences in the application of the principles of the disclosure. Accordingly, the disclosure is not intended to be limited to less than the scope set forth in the following claims and equivalents.

INCORPORATION BY REFERENCE

All references, articles, publications, patents, patent publications, and patent applications cited herein are incorporated by reference in their entireties for all purposes. However, mention of any reference, article, publication, patent, patent publication, and patent application cited herein is not, and should not be taken as an acknowledgment or any form of suggestion that they constitute valid prior art or form part of the common general knowledge in any country in the world. It is to be understood that, while the disclosure has been described in conjunction with the detailed description, thereof, the foregoing description is intended to illustrate and not limit the scope. Other aspects, advantages, and modifications are within the scope of the claims set forth below. All publications, patents, and patent applications cited in this specification are herein incorporated by reference as if each individual publication or patent application were specifically and individually indicated to be incorporated by reference.

What is claimed is:

1. A method, comprising:
    first, contacting an aqueous solution of an organic ligand salt of the formula $A_x(L^{-x})$ with a mesoporous material (MPM) to form an impregnated mesoporous salt material of the formula $A_x(L^{-x})$/MPM where A is a counter ion, each x is independently a whole number, and L is an organic ligand;
    second, treating the impregnated mesoporous salt material with a nitrogen flow saturated with an aqueous acidic solution to form an impregnated mesoporous acid material of the formula $H_x(L^{-x})$/MPM where H is hydrogen;
    third, contacting an aqueous solution of a metal precursor of the formula $M^{+y}(B)_y$ with the impregnated mesoporous acid material to form an impregnated mesoporous metal organic framework precursor of the formula $[M^{+y}(B)_y][H_x(L^{-x})]$/MPM where M is a metal, each y is independently a whole number, and B is an anion;
    finally, drying the impregnated mesoporous metal organic framework precursor by heating or under vacuum; and
    at least one of 1) heating the impregnated mesoporous metal organic framework precursor in the absence of a solvent to a temperature between 120 and 300° C. or 2) exposing the impregnated mesoporous metal organic framework precursor to a volatile vapor in the absence of a solvent such that the heating or the exposing forms a hybrid material of the formula $(M^{+y}L^{-x})$-MPM;
    wherein the hybrid material comprises a nano-crystalline metal organic framework (MOF) embedded within the mesoporous material;
    wherein the mesoporous material is at least one selected from the group consisting of a mesoporous metal oxide, a mesoporous silica, a mesoporous carbon, a mesoporous polymer, a mesoporous silicoalumina (zeolite), a mesoporous organosilica, and a mesoporous aluminophosphate;
    wherein the organic ligand $(L^{-x})$ of the organic ligand salt is at least one selected from the group consisting of terephthalates, benzene-1,3,5-tricarboxylates, 2,5-dioxibenzene dicarboxylates, biphenyl-4,4'-dicarboxylates, and derivatives thereof;
    wherein the metal $(M^{+y})$ of the metal precursor is at least one transition metal selected from the group consisting of Mg, V, Cr, Mo, Zr, Hf, Mn, Fe, Co, Cu, Ni, Zn, Ru, Al, and Ga; and
    wherein the hybrid material comprises mesopores with an average diameter in the range of 2-50 nm and micropores with an average diameter in the range of 0.5-5.0 nm.

2. The method of claim 1, wherein the nano-crystalline metal organic framework is present only within the mesopores or void spaces of the mesoporous material and homogeneously dispersed within the mesopores or void spaces of the mesoporous material.

3. The method of claim 1, further comprising drying at least one selected from the group consisting of the impregnated mesoporous salt material, the impregnated mesoporous acid material, the impregnated mesoporous metal organic framework precursor, and the hybrid material at a temperature in the range of 25-160° C. under a vacuum.

4. The method of claim 1, further comprising:
    washing the hybrid material with distilled water; and
    extracting water from the hybrid material in a Soxhlet system recycling methanol.

5. The method of claim 1, wherein the mesoporous metal oxide is aluminum oxide, cerium oxide, titanium oxide, zirconium oxide, or magnesium oxide; or the mesoporous silica is SBA-15 or MCM 41.

6. The method of claim 1, wherein the organic ligand $(L^{-x})$ of the organic ligand salt is at least one selected from the group consisting of, terephthalate, benzene-1,3,5-tricarboxylate, and derivatives thereof.

7. The method of claim 1, wherein the metal $(M^{+y})$ of the metal precursor is at least one transition metal selected from the group consisting of Cr, Zr, Hf, Co, Ni, Zn, Ru, and Al.

8. The method of claim 1, wherein the metal organic framework is at least one selected from the group consisting of MIL-101, MIL-100, MIL-53, MOF-74, UiO-66, UiO-67, ZIF-8, ZIFs, HKUST-1, $M_2$(dobpdc), NU-1000, PCN-222, PCN-224, and derivatives thereof.

9. The method of claim 1, wherein the hybrid material has a weight percentage of the metal organic framework in the range of 5-50% relative to the total weight of the hybrid material.

10. The method of claim 1, wherein the hybrid material comprises mesopores with an average diameter in the range of 6-40 nm and micropores with an average diameter in the range of 2.0-4.0 nm.

11. The method of claim 1, wherein the nano-crystalline metal organic framework has an average longest linear dimension of less than 40 nm.

12. The method of claim 1, wherein the hybrid material has a surface area in the range of 200-1200 m²/g.

13. The method of claim 1, wherein the hybrid material has a surface area in the range of 105-500% that of the surface area of the impregnated mesoporous salt material.

14. The method of claim 1, wherein the hybrid material has an average longest linear dimension of 100-500 µm.

15. The method of claim 1, wherein the metal $(M^{+y})$ of the metal precursor is Cr.

16. The method of claim 1, wherein the metal $(M^{+y})$ of the metal precursor is Cu.

17. The method of claim 1, wherein the metal $(M^{+y})$ of the metal precursor is Fe.

18. The method of claim 1, wherein the metal $(M^{+y})$ of the metal precursor is Mn.

19. A method, comprising:
first, contacting an aqueous solution of an organic ligand salt of the formula $A_x(L^{-x})$ with a mesoporous material (MPM) to form an impregnated mesoporous salt material of the formula $A_x(L^{-x})$/MPM where A is a counter ion, x is a whole number, and L is an organic ligand;
second, treating the impregnated mesoporous salt material with a nitrogen flow saturated with an aqueous acidic solution to form an impregnated mesoporous acid material of the formula $H_x(L^{-x})$/MPM where H is hydrogen;
third, contacting an aqueous solution of a metal precursor of the formula $M^{+y}(B)_y$ with the impregnated mesoporous acid material to form an impregnated mesoporous metal organic framework precursor of the formula $[M^{+y}(B)_y][H_x(L^{-x})]$/MPM where M is a metal, y is a whole number, and B is an anion; and
finally, at least one of 1) heating the impregnated mesoporous metal organic framework precursor in the presence of a catalytic amount of a solvent to a temperature between 120 and 300° C. or 2) exposing the impregnated mesoporous metal organic framework precursor to a volatile vapor in the presence of a catalytic amount of a solvent such that the heating or the exposing forms a hybrid material of the formula $(M^{+y}L^{-x})$/MPM;
wherein the hybrid material comprises a nano-crystalline metal organic framework (MOF) embedded within the mesoporous material;
wherein the nano-crystalline metal organic framework is homogeneously dispersed and present only within the mesopores or void spaces of the mesoporous material; and
wherein the solvent is at least one selected from the group consisting of water, ethanol, methanol, tetrahydrofuran, and N,N-dimethylformamide and is present in a weight amount of less than 75% of the weight amount of the hybrid material formed.

* * * * *